(12) United States Patent
Oki et al.

(10) Patent No.: US 8,922,726 B2
(45) Date of Patent: Dec. 30, 2014

(54) NON-SPECTACLED STEREOSCOPIC DISPLAY APPARATUS CAPABLE OF DECREASING CROSSTALK

(75) Inventors: Yoji Oki, Yokohama (JP); Masatsuna Sawada, Kumagaya (JP)

(73) Assignee: Stanley Electric Co., Ltd., Tokyo (JP)

( * ) Notice: Subject to any disclaimer, the term of this patent is extended or adjusted under 35 U.S.C. 154(b) by 303 days.

(21) Appl. No.: 13/555,390

(22) Filed: Jul. 23, 2012

(65) Prior Publication Data

US 2013/0027366 A1  Jan. 31, 2013

(30) Foreign Application Priority Data

Jul. 25, 2011 (JP) ................................. 2011-161961

(51) Int. Cl.
| G02F 1/1335 | (2006.01) |
| G02B 27/22 | (2006.01) |
| H04N 13/04 | (2006.01) |
| F21V 8/00 | (2006.01) |
| G09G 3/00 | (2006.01) |

(52) U.S. Cl.
CPC ........ *G02B 27/2214* (2013.01); *H04N 13/0434* (2013.01); *H04N 13/0497* (2013.01); *G02B 6/0038* (2013.01); *G02B 6/0056* (2013.01); *G09G 3/003* (2013.01); *G09G 2320/0233* (2013.01); *G02B 6/0016* (2013.01)
USPC ............................................. 349/15; 349/96

(58) Field of Classification Search
CPC ................... G02F 1/133528; G02F 1/133536; G02F 1/13363; G02B 27/2214; G02B 27/26; G02B 5/3033; G02B 5/3066; H04N 13/0404; H04N 13/0403

USPC ...................................................... 349/15, 96
See application file for complete search history.

(56) References Cited

U.S. PATENT DOCUMENTS

| 2012/0287037 A1* | 11/2012 | Shikii et al. ................... 345/156 |
| 2013/0249961 A1* | 9/2013 | Oki et al. ....................... 345/690 |

FOREIGN PATENT DOCUMENTS

| JP | 2002-090717 A | 3/2002 | |
| JP | 2010-262198 A | 11/2010 | |
| JP | 2010262198 A * | 11/2010 | ............. G02B 27/22 |
| JP | 2010-286700 A | 12/2010 | |
| JP | 2010-286813 A | 12/2010 | |
| JP | 2010286700 A * | 12/2010 | ........... G02F 1/13357 |
| JP | 2010286813 A * | 12/2010 | ............. G02B 27/02 |

* cited by examiner

*Primary Examiner* — Mike Qi
(74) *Attorney, Agent, or Firm* — Holtz, Holtz, Goodman & Chick PC

(57) ABSTRACT

A non-spectacled stereoscopic display apparatus includes: a light guide plate having a light distributing face, a light emitting face, and first and second light incident faces; first and second light sources disposed on the first and second light incident faces, respectively; a single-face prism sheet disposed on the light emitting face of the light guide plate; a transmissive display panel disposed on a light emitting face of the single-face prism sheet with no air gap therebetween, the transmissive display panel having a polarizing plate opposing the light emitting face of the single-face prism sheet; and a synchronous drive circuit adapted to synchronize the first and second light sources to display parallax images on the transmissive display panel. A polarizing direction of polarization anisotropy of the light emitting face of the single-face prism sheet coincides with a polarizing direction of the polarizing plate.

8 Claims, 26 Drawing Sheets

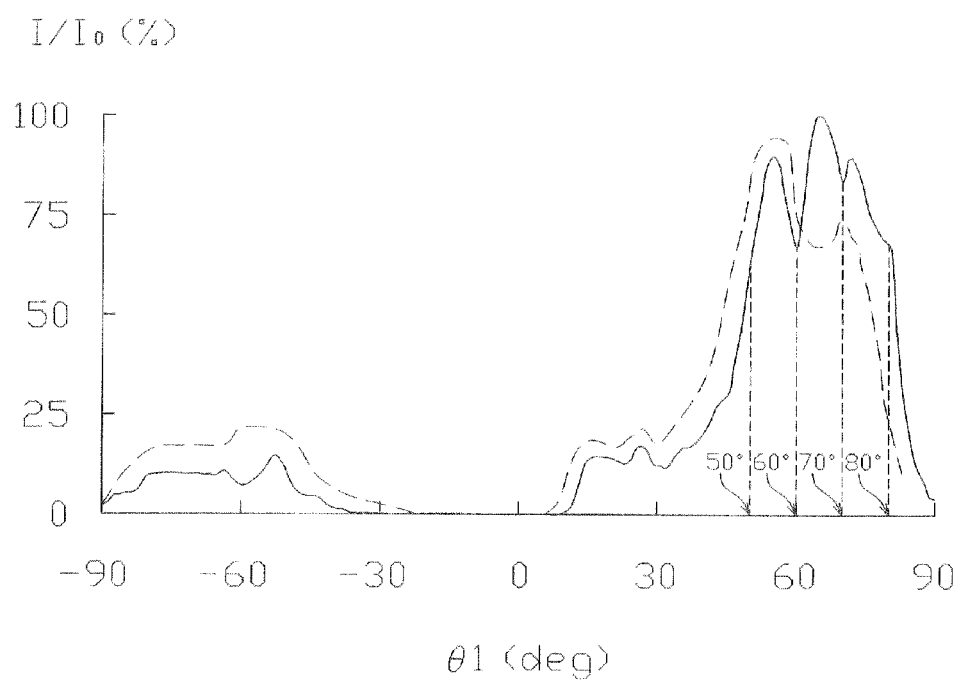

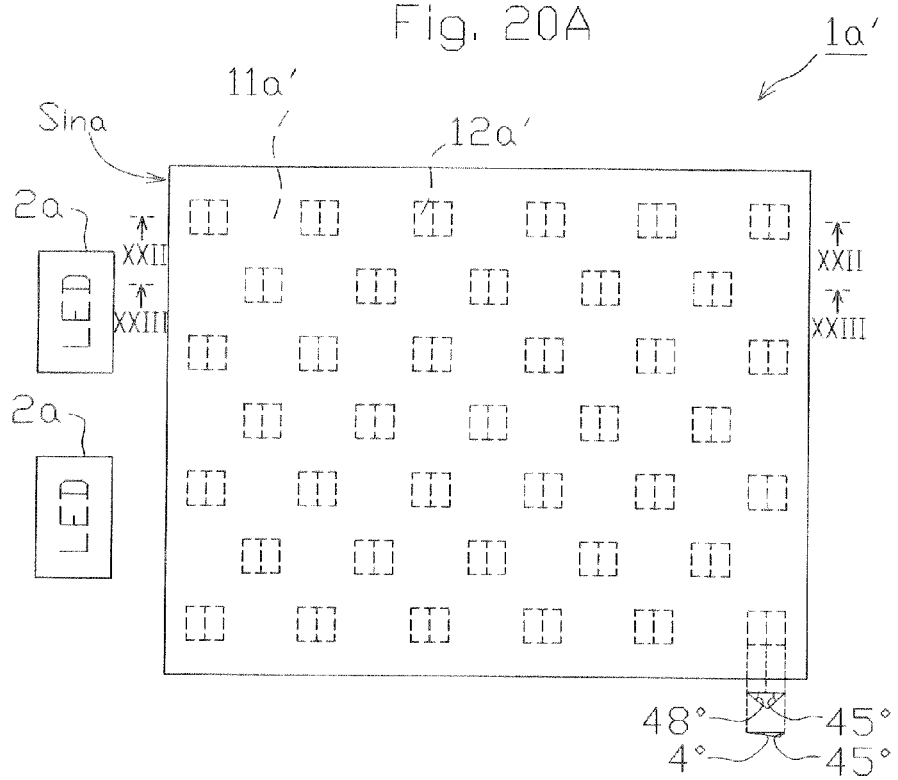
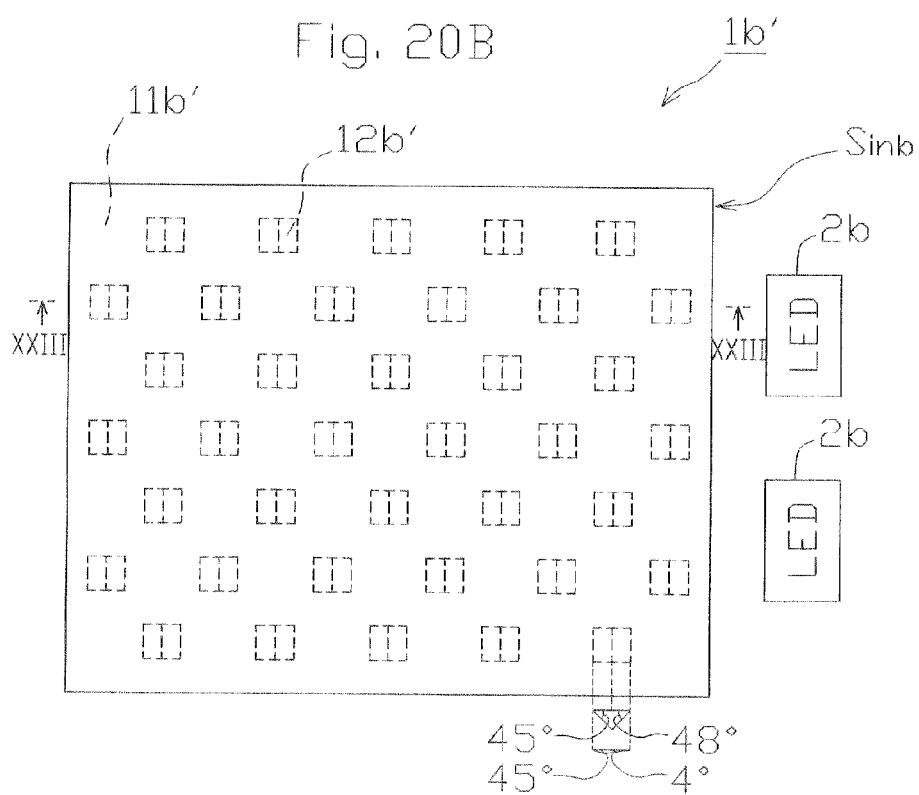

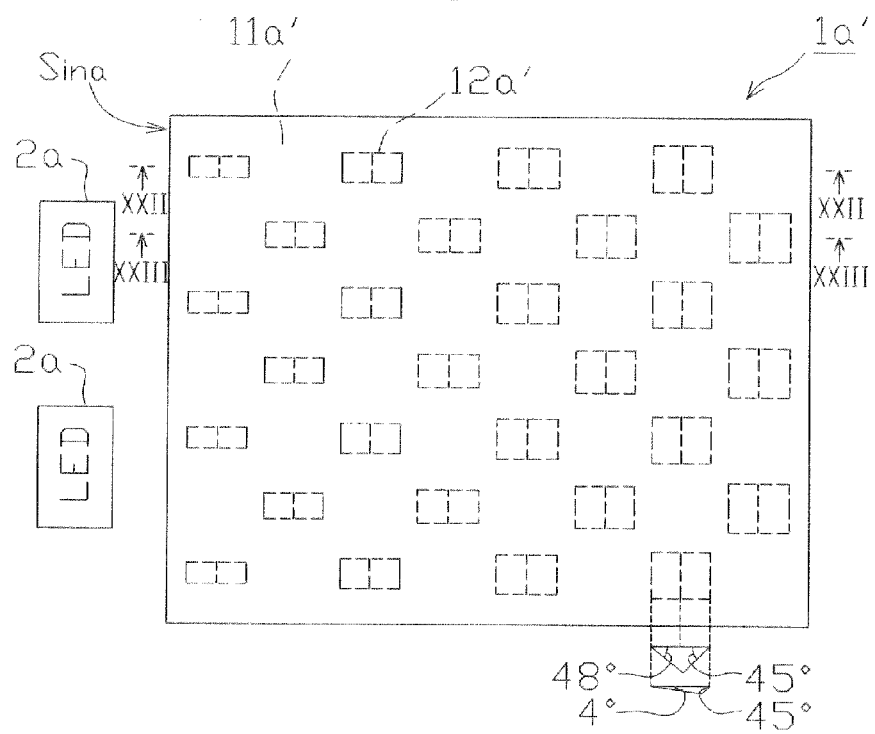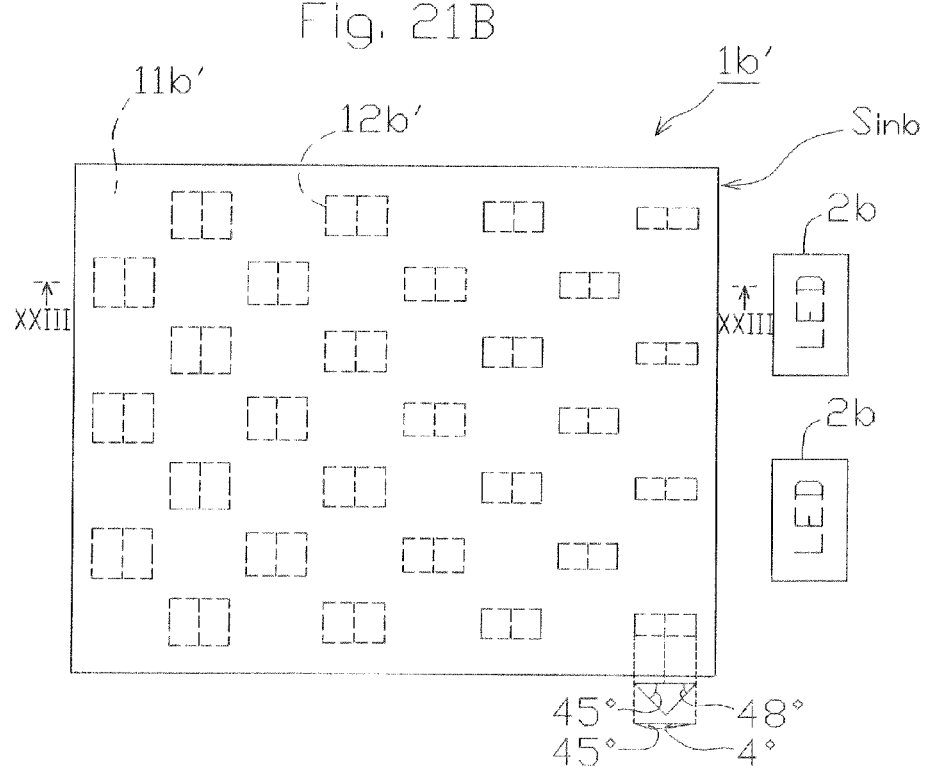

NON-SPECTACLED STEREOSCOPIC DISPLAY APPARATUS CAPABLE OF DECREASING CROSSTALK

This application claims the priority benefit under 35 U.S.C. §119 to Japanese Patent Application No. JP2011-161961 filed on Jul. 25, 2011, which disclosure is hereby incorporated in its entirety by reference.

BACKGROUND

1. Field

The presently disclosed subject matter relates to a non-spectacled stereoscopic display apparatus.

2. Description of the Related Art

Generally, a stereoscopic display apparatus provides parallax images from viewpoints of both eyes of an observer. The stereoscopic display apparatus is classified into the spectacled type and the non-spectacled type. The spectacled type stereoscopic display apparatus need specific glasses, while the non-spectacled type stereoscopic display apparatus needs no specific glasses.

As illustrated in FIG. 25, which illustrates a prior art non-spectacled stereoscopic display apparatus (see: JP2010-262198A), this non-spectacled stereoscopic display apparatus is constructed by a light guide plate 1 with a light distributing face $S_d$ and a light emitting face $S_{out1}$, two light sources 2a and 2b disposed on light incident faces $S_{ina}$ and $S_{inb}$ of the light guide plate 1, a single-face-deformed triangular prism sheet 3 disposed on the light emitting face $S_{out1}$ of the light guide plate 1, a transmissive liquid crystal display panel 4 disposed on a light emitting face $S_{out3}$ of the single-face-deformed triangular prism sheet 3, and a synchronous drive circuit 5 for synchronizing the light sources 2a and 2b to display parallax images on the transmissive liquid crystal display panel 4. When one of the light sources 2a and 2b is turned ON, the single-face-deformed triangular prism sheet 3 is configured to emit light to one eye of the observer with no emission of light to the other eye. Also, provided on the light incident and light emission sides, respectively, of the transmissive liquid crystal display panel 4 are polarizing plates 4a and 4b. An air gap 6 is present between the single-face-deformed triangular prism sheet 3 and the transmissive liquid crystal display panel 4. Thus, a stereoscopic image with the same number of pixels as that of the transmissive liquid crystal display panel 4 can be displayed.

In FIG. 25, two light guide plates, i.e., a lower light guide plate and an upper light guide plate superposed onto the lower light guide plate can be provided instead of the light guide plate 1 (see: JP2010-286813A).

In FIG. 25, the light guide plate 1, the light sources 2a and 2b, and the single-face-deformed triangular prism sheet 3 can entirely be called a three-dimensional (3D) backlight source BS.

In the non-spectacled stereoscopic display apparatus of FIG. 25, however, since anisotropy of polarization of the emitted light from the light emitting face $S_{out3}$ of the 3D backlight source BS is not determined, the polarization of the emitted light does not always coincide with the polarizing axis of the polarizing plate 4a, so that the optical characteristics of the stereoscopic display apparatus of FIG. 25 would deteriorate.

Also, in the non-spectacled stereoscopic display apparatus of FIG. 25, as illustrated in FIG. 26, since the air gap 6 is present between the 3D backlight source BS and the transmissive liquid crystal display panel 4, light L1 for the left eye side may be emitted at an angle of less than 15° from the transmissive liquid crystal display panel 4; however, other light L2 for the left eye side may be totally reflected at the light emitting face $S_{out3}$ of the single-face deformed triangular prism sheet 3 due to the difference Δn=0.57 in refractive index n between the single-face-deformed triangular prism sheet 3 with n=1.57 and the air gap 6 with n=1.0, so that the light L2 would be stray light SL whose part is returned to the light guide plate 1 and emitted at an angle of −4° from the transmissive liquid crystal display panel 4 through the single-face-deformed triangular prism sheet 3 as a crosstalk for the right eye side, thus hindering a stereoscopic display.

Note that JP2002-090717A makes an angle between a ridegeline (talweg) of a light guide plate and a polarizing axis of a polarizing plate of a liquid crystal panel almost zero, or less than 45°, thereby increasing the luminous intensity. Also, JP2010-286700A discloses a polarizing plate including a polarizing film and a triangular prism sheet which are combined by an adhesive layer with no air gap, thereby increasing the luminous intensity.

SUMMARY

The presently disclosed subject matter seeks to solve one or more of the above-described problems.

According to the presently disclosed subject matter, a non-spectacled stereoscopic display apparatus includes: a light guide plate having a light distributing face, a light emitting face opposing said light distributing face, and first and second light incident faces opposing each other on sides of the light distributing face and the light emitting face; first and second light sources disposed on the first and second light incident faces, respectively, of the light guide plate; a single-face prism sheet disposed on the light emitting face of the light guide plate; a transmissive display panel disposed on a light emitting face of the single-face prism sheet with no air gap therebetween, the transmissive display panel having a polarizing plate opposing the light emitting face of the single-face prism sheet; and a synchronous drive circuit adapted to synchronize the first and second light sources to display parallax images on the transmissive display panel. A polarizing direction of polarization anisotropy of the light emitting face of the single-face prism sheet coincides with a polarizing direction of the polarizing plate.

Also, according to the presently disclosed subject matter, a non-spectacled stereoscopic display apparatus includes: a first light guide plate having a first light distributing face, a first light emitting face opposing the first light distributing face, and a first light incident face on one side of the first light distributing face and the first light emitting face; a second light guide plate having a second light distributing face, a second light emitting face opposing the second light distributing face, and a second light incident face on one side of the second light distributing face and the second light emitting face, the first light distributing face of the first light guide plate opposing the second light emitting face of the second light guide plate; a first light source disposed on the first light incident face of the first light guide plate; a second light source disposed on the second light incident face of the second light guide plate, the first and second light sources opposite to each other; a single-face prism sheet disposed on the first light emitting face of the first light guide plate; a transmissive display panel disposed on a light face of the single face prism sheet with no air gap therebetween, the transmissive display panel having a polarizing plate opposing the light emitting face of the single-face prism sheet; and a synchronous drive circuit adapted to synchronize the first and second light sources to display parallax images on the transmissive display panel. A polarizing direction of polarization anisotropy of the light emitting face of the single-face prism sheet coincides with a polarizing direction of the polarizing plate.

Further, a contact layer is disposed between the single-face prism sheet and the transmissive display panel. The contact layer comprises a base and an adhesive layer coated on the base. Or, the contact layer comprises an adhesive layer coated on the single-face prism sheet.

According to the presently disclosed subject matter, the polarizing direction of the polarizing plate is adjusted to increase the light component incident from the light incident faces and emitted from the light emitting face of the single-face triangular prism sheet and suppress the light multiply-reflected within the light guide plate(s). Also, since the transmissive display panel is disposed on the single-face triangular prism sheet, the stray light component caused by the total reflection would be suppressed. Thus, the crosstalk between two parallax images of both eyes of the observer would be remarkably decreased by the superposing effects of the suppression of the multiple-reflection and the stray light component.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 7 is a graph illustrating a left-eye light distribution of the light guide plate when the left-eye light source is turned ON;

FIG. 11 is a graph illustrating a left-eye light distribution of the single-face-deformed triangular prism sheet when the left-eye light source is turned ON;

FIGS. 20A and 20B are plan views illustrating examples of the light guide plates of FIG. 19;

FIGS. 21A and 21B are views illustrating other examples of the light guide plates of FIG. 19;

FIG. 24 is a graph illustrating a left-eye light distribution of the light guide plate of FIG. 19 when the left-eye light source is turned ON and a right-eye light distribution of the right-eye light guide plate when the right-eye light source of FIG. 19 is turned ON;

DETAILED DESCRIPTION OF EXEMPLARY EMBODIMENTS

Figure 1:
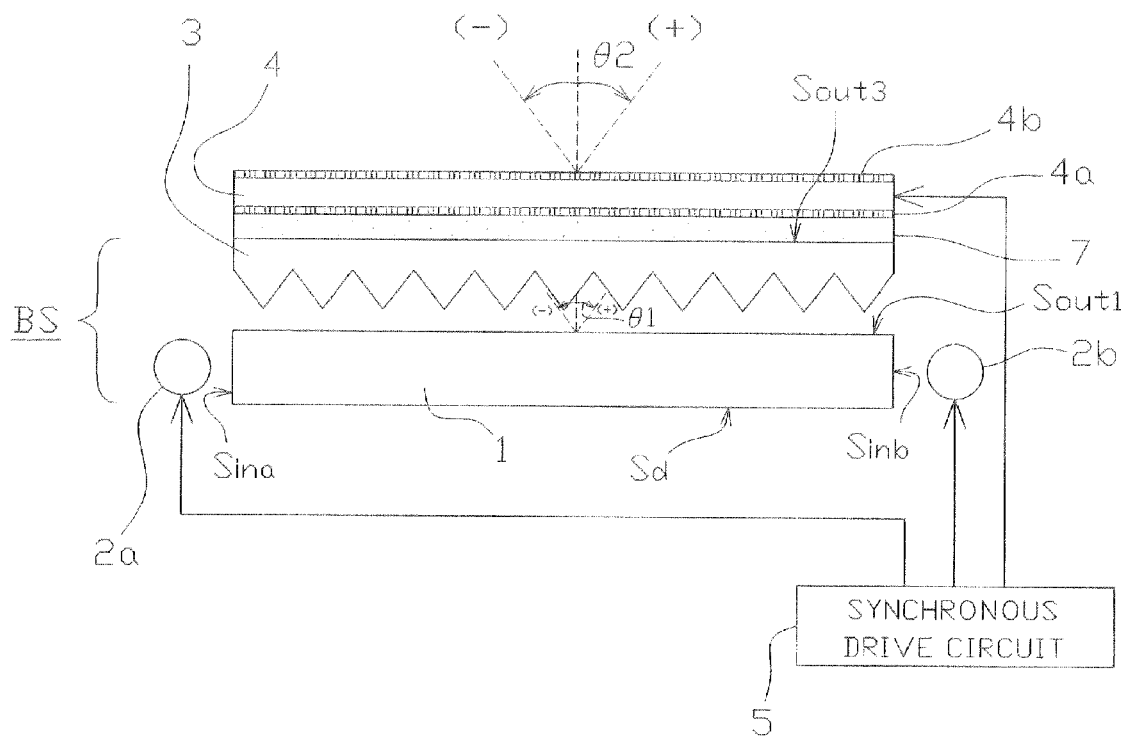
FIG. 1 is a view illustrating a first embodiment of the non-spectacled stereoscopic display apparatus according to the presently disclosed subject matter.
Figure 2:
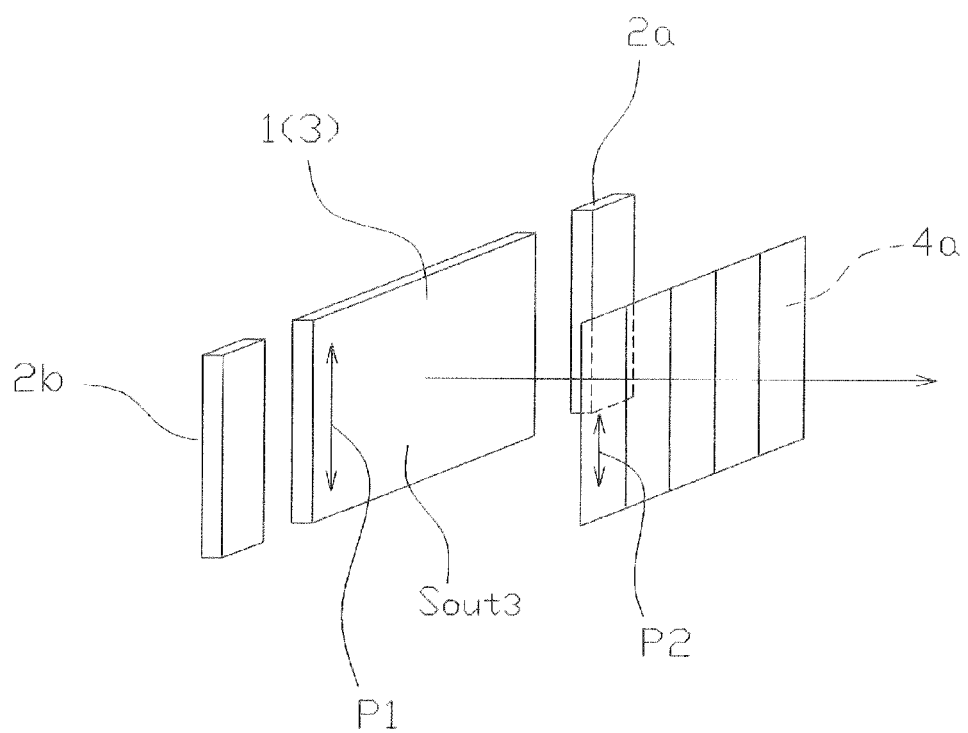
FIG. 2 is a view illustrating a relationship between a polarizing angle of the polarization anisotropy of the light emitting face of the single-face-deformed triangular prism sheet and the polarizing axis of the polarizing plate of the transmissive liquid crystal display panel of FIG. 1.

In FIG. 1, which illustrates a first embodiment of the non-spectacled stereoscopic display apparatus according to the presently disclosed subject matter, the polarizing direction P1 of polarization anisotropy of the light emitting face $S_{out3}$ of the single-face-deformed triangular prism sheet 3 is made to coincide with the polarizing direction (axis) P2 of the polarizing plate 4a of the transmissive liquid crystal display panel 4. Note that the polarization anisotropy of the light emitting face $S_{out3}$ of the single-face-deformed triangular prism sheet 3 is predetermined by the light guide plate 1. That is, as illustrated in FIG. 2, the polarizing direction P1 of the single-face-deformed triangular prism sheet 3 is in parallel with the polarizing direction P2 of the polarizing plate 4a.

Figure 3:
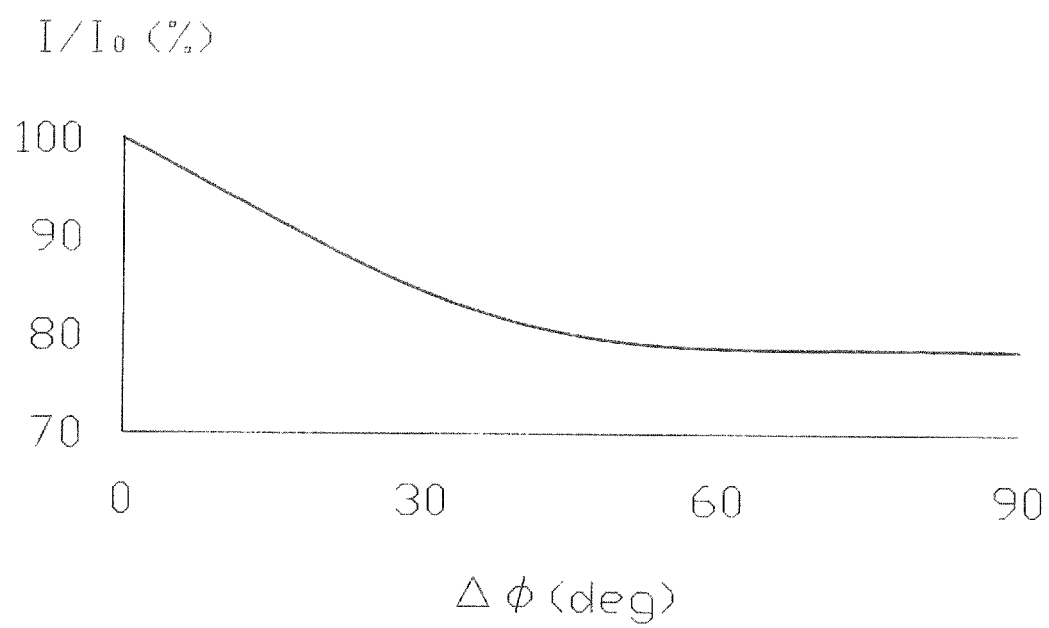
FIG. 3 is a graph illustrating a relationship between the difference angle between the direction of the main polarization of the emitted light of the 3D backlight source and the polarizing angle of the polarizing plate, and the relative luminous intensity of the transmissive liquid crystal display panel of FIG. 1.

In FIG. 3, which illustrates a relationship between the difference angle Δϕ between the direction of the main polarization of the emitted light of the 3D backlight source BS and the polarizing angle of the polarizing plate 4a, and the relative luminous intensity $I/I_0$ of the transmissive liquid crystal display panel 4 of FIG. 1, it is clear that the emitted light of the 3D backlight source BS has a polarization anisotropy. In FIG.

3, $I_0$ is a luminous intensity at the light incident face of the transmissive liquid crystal display panel 4, and I is a luminous intensity at the light emitting face of the transmissive liquid crystal display panel 4. For example, in FIG. 3, when the difference angle $\Delta\phi$ is zero, the relative luminous intensity $I/I_0$ of the transmissive liquid crystal display panel 4 is maximum. Note that, if the polarization of the emitted light of the 3D backlight source BS is isotropic, the relative luminous intensity $I/I_0$ of the transmissive liquid crystal display panel 4 will not change.

The polarization anisotropy of the main emitted light of the 3D backlight source BS is mainly due to the specular reflection component of the light incident from the light incident faces $S_{ina}$ and $S_{inb}$ and emitted from the light emitting face $S_{out1}$ without internal reflections within the light guide plate 1. The specular reflection component is considered to have a specific polarization anisotropy strong in a specific direction. On the other hand, light multiply-reflected within the light guide plate 1 would have a polarization anisotropy after one reflection at a face in the light guide plate 1; however, a large amount of such light gathers so that polarization anisotropy is hardly exhibited.

Thus, the polarizing direction P2 of the polarizing plate 4a is adjusted to increase the light component incident from the light incident faces $S_{ina}$ and $S_{inb}$ and emitted from the light emitting face $S_{out3}$ of the single-face-deformed triangular prism sheet 3 and suppress the light multiply-reflected within the light guide plate 1 in relation to the above-mentioned light component.

Figure 25:
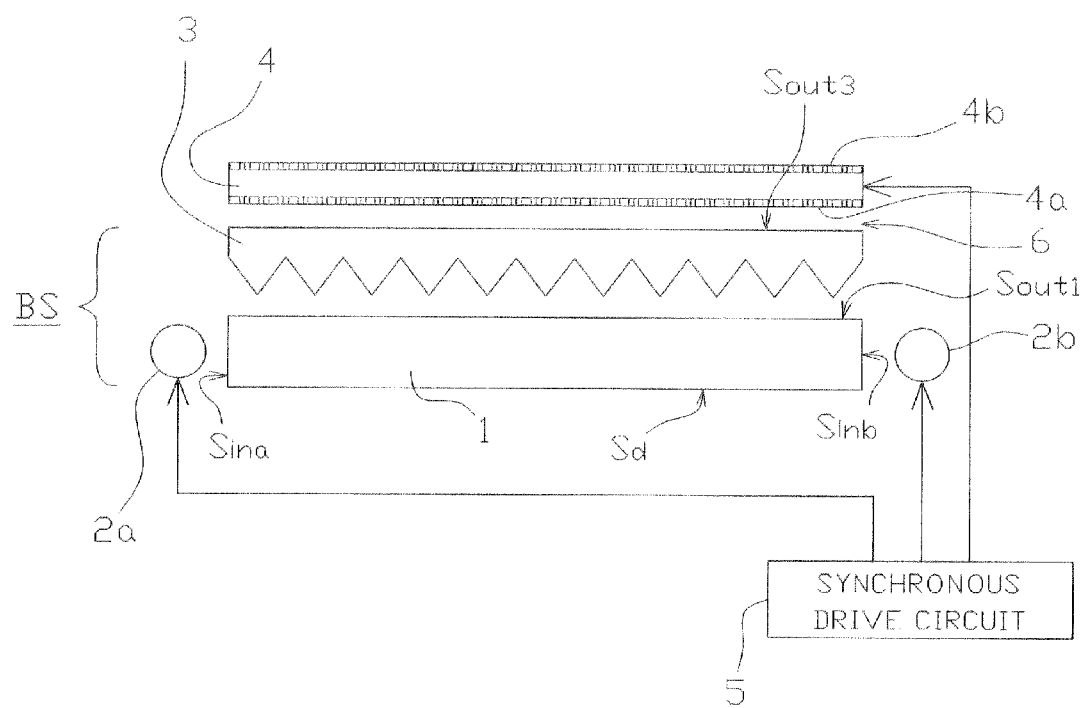
FIG. 25 is a view illustrating a prior art non-spectacled stereoscopic display apparatus.
Figure 26:
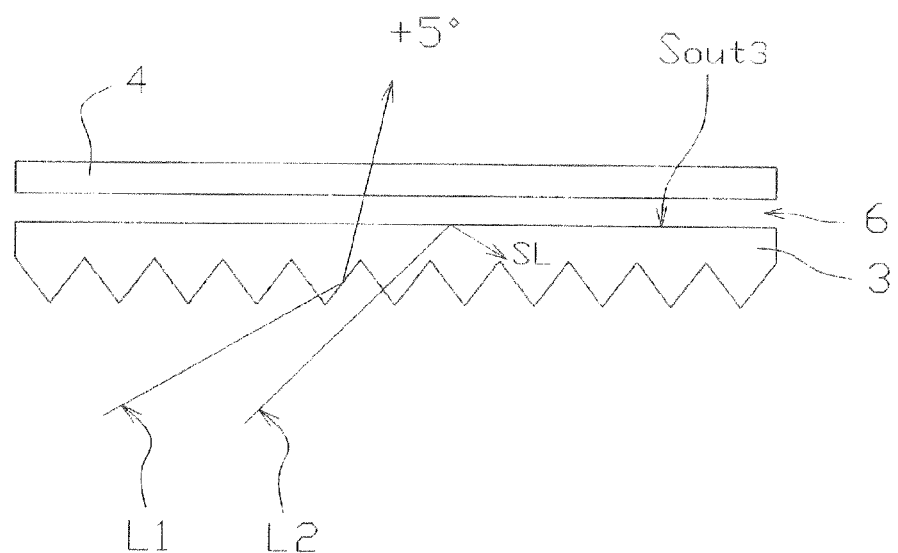
FIG. 26 is a cross-sectional view for explaining the problem in the non-spectacled stereoscopic display apparatus of FIG. 25.

Also, in FIG. 1, a contact layer 7 is provided instead of the air gap 6 of FIG. 25. For example, the contact layer 7 is an adhesive layer consisting of a polyethylene terephthalate (PET) base whose both faces are coated with silicone resin, polyurethane resin or acryl resin. The refractive index n of the contact layer 7 is preferably close to that of the single-face-deformed triangular prism sheet 3, i.e., the difference in refractive index n between the single-face-deformed triangular prism sheet 3 and the contact layer 7 is preferably close to zero, to thereby suppress the stray light component caused by the total reflection. For example, the single-face-deformed triangular prism sheet 3 is made of PET, and the base of the contact layer 7 is made of PET, so that the difference in refractive index n therebetween is almost zero. Note that the stray light caused by the total reflection would return from the single-face-deformed triangular prism sheet 3 to the light guide plate 1, and would penetrate through the single-face-deformed triangular prism sheet 3, which would incur crosstalk between two parallax images of both eyes of the observer.

Note that the contact layer 7 can be an adhesive layer with no base. For example, the contact layer 7 is made of silicone resin, polyurethane resin or acryl resin, and this contact layer 7 can be coated directly on the light emitting face $S_{out3}$ of the single-face-deformed triangular prism sheet 3.

Figure 4:
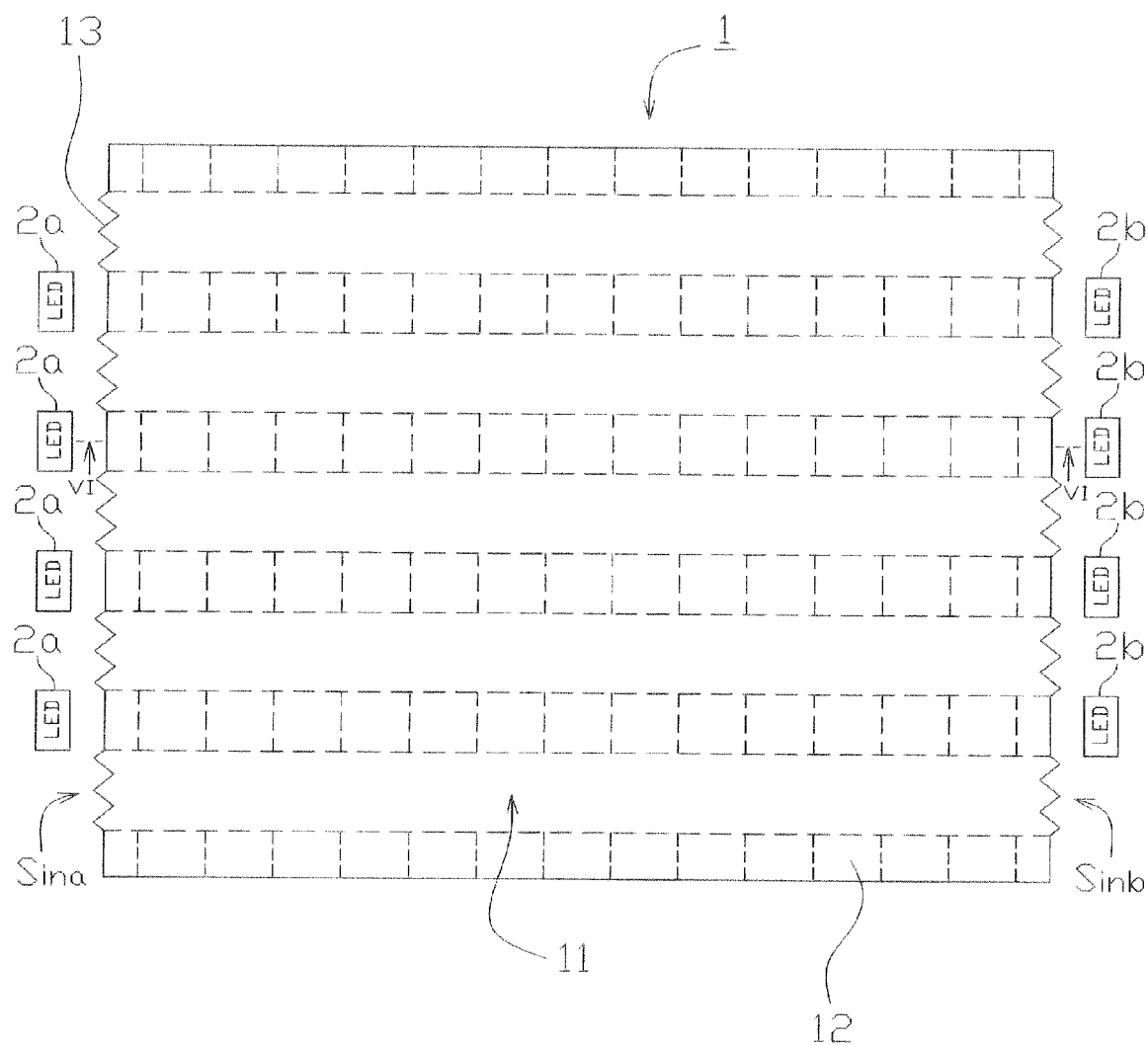
FIG. 4 is a plan view illustrating a first example of the light guide plate of FIG. 1.

In FIG. 4, which illustrates a first example of the light guide plate 1 of FIG. 1, the light guide plate 1 is made of a transmissive material such as acryl resin or polycarbonate resin. The light guide plate 1 is symmetrical with respect to a center face between the light incident faces $S_{ina}$ and $S_{inb}$. A plurality of flat mirror finishing portions 11 are provided on the light distributing face $S_d$ of the light guide plate 1 and extend between the light incident face $S_{ina}$ and the light incident face $S_{inb}$. The flat mirror finishing portions 11 serve as means for spreading light to the inner part of the light guide plate 1. A plurality of triangular prism sequences 12 are provided on areas of the light distributing face $S_d$ of the light guide plate 1 where the flat mirror finishing portions 11 are not provided.

Each of the triangular prism sequences 12 includes a plurality of equidistantly-arranged triangular prisms for bending the path of light. Embossed portions 13 such as triangular-shaped portions, circular portions or microlens-shaped portions are provided at the light incident faces $S_{ina}$ and $S_{inb}$ on the sides of the flat mirror finishing portions 11, in order to suppress returning light.

Each of the light sources 2a and 2b can be formed by one or more light emitting diodes (LEDs).

In FIG. 4, the width of each of the light sources 2a and 2b is the same as that of each of the triangular prism sequences 12. In this case, the nearer to the light sources 2a and 2b one prism face of the triangular prism sequences 12, the larger the amount of light totally-reflected by that prism face. Therefore, the emitted light from the light guide plate 1 is not uniform along the triangular prism sequences 12 per one width of the light sources 2a and 2b and depends upon the magnitude of the stereoscopic display apparatus of FIG. 1 and the required uniformity of face luminous intensity.

Figure 5:
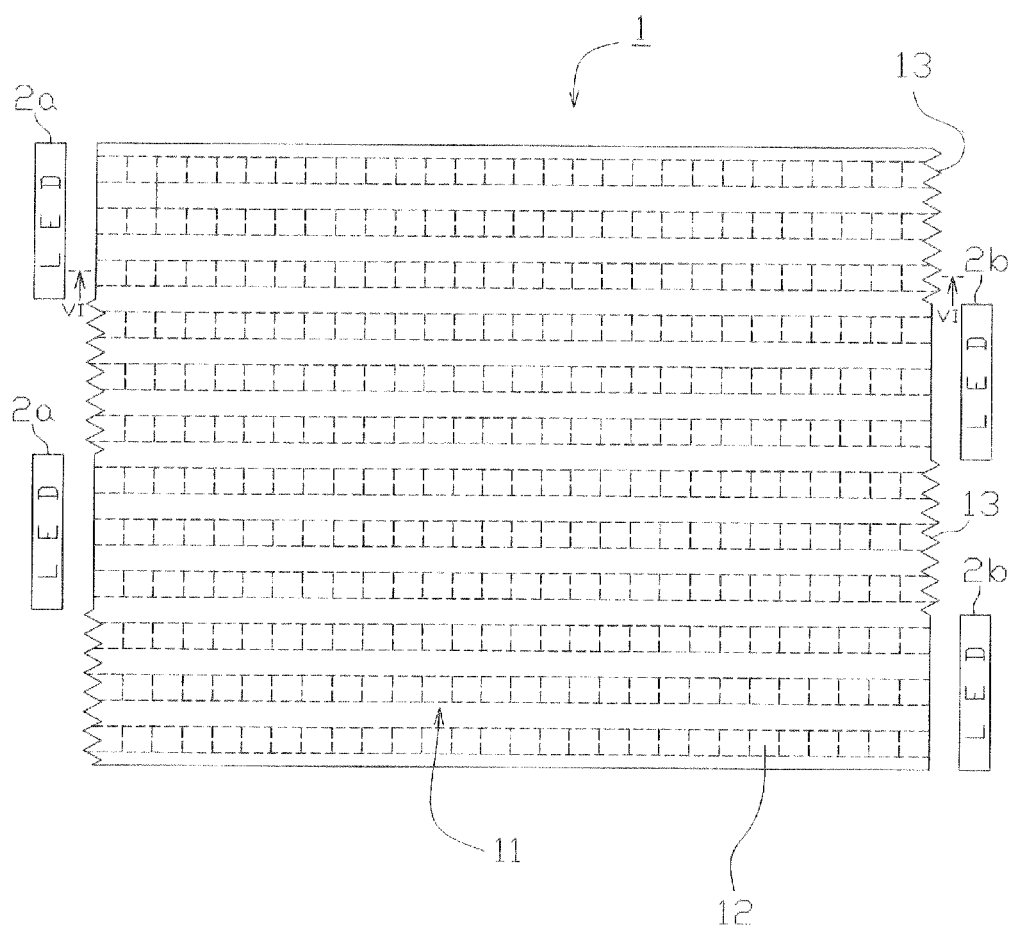
FIG. 5 is a plan view illustrating a second example of the light guide plate of FIG. 1.

In FIG. 5, which illustrates a second example of the light guide plate 1 of FIG. 1, a plurality of flat mirror finishing portions 11 such as three flat mirror finishing portions 11 and a plurality of triangular prism sequences 12 such as three triangular prism sequences 12 are allocated per one width of the light sources 2a and 2b. Additionally, the light sources 2a and 2b alternate with each other. Also, embossed portions 13 such as triangular-shaped portions, circular portions or microlens-shaped portions are provided at the light incident faces $S_{ina}$ and $S_{inb}$ where the light sources 2a and 2b are not provided, in order to suppress returning light. Thus, the emitted light from the light guide plate 1 is more uniform.

In FIG. 4, the light sources 2a and 2b are symmetrically located with respect to each of the triangular prism sequences 12 which have flat faces at the light incident faces $S_{ina}$ and $S_{inb}$. Therefore, light incident from the light sources 2a or 2b and introduced into one of the triangular prism sequences 12 would be reflected by the flat face at the light incident face $S_{ina}$ or $S_{inb}$ to generate returning light. On the other hand, in FIG. 5, the light sources 2a and 2b oppose the embossed portions 13 at the light incident faces $S_{inb}$ and $S_{ina}$, respectively. As a result, the returning light is suppressed.

Figure 6A:
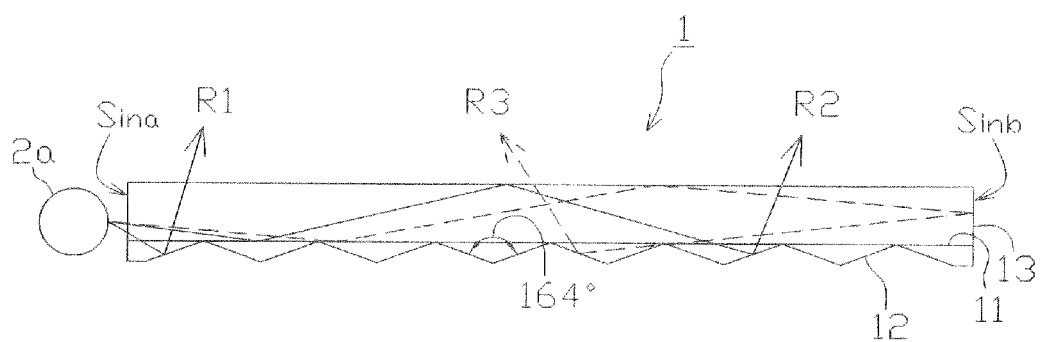
FIGS. 6A and 6B are cross-sectional views taken along the line VI-VI in FIGS. 4 and 5.
Figure 6B:
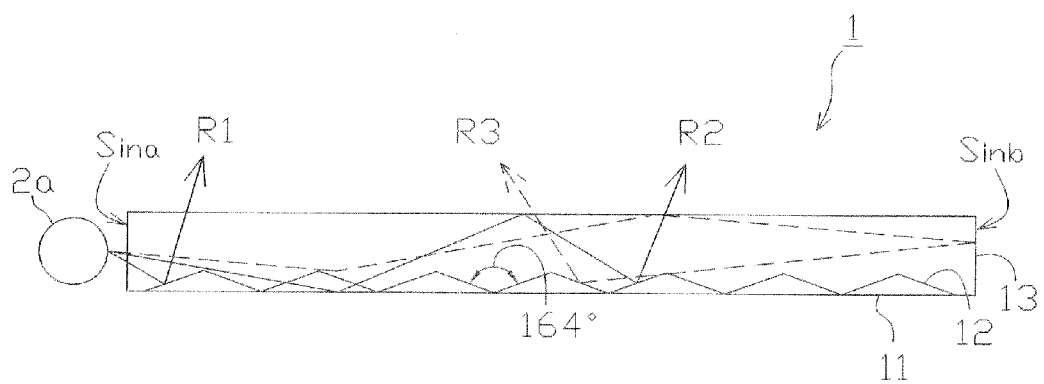

FIGS. 6A and 6B are cross-sectional views taken along the line VI-VI in FIGS. 4 and 5.

As illustrated in FIG. 6A, the triangular prism sequences 12 may be protruded from the flat mirror finishing portions 11. Also, as illustrated in FIG. 6B, the flat mirror finishing portions 11 may be protruded from the triangular prism sequences 12. In FIGS. 6A and 6B, the light sources 2a and 2b are turned ON and OFF, respectively; however, since the light sources 2a and 2b are symmetrically located with the center thereof, when the light sources 2a and 2b are turned OFF and ON, respectively, similar operations can be carried out.

In FIGS. 6A and 6B, light R1 as indicated by a solid line from the light source 2a is totally-reflected by one prism face of the triangular prism sequences 12, and then, is emitted from the light guide plate 1. Also, light R2 as indicated by another solid line from the light source 2a is totally-reflected by the flat mirror finishing portions 11, and then, is totally-reflected by one prism face of the triangular prism sequences 12. Finally, the light R2 is emitted from the light guide plate 1. Thus, the lights R1 and R2 are emitted at a (+) angle direction of the light guide plate 1 and are, therefore, provided for a left-eye parallax image.

In FIGS. 6A and 6B, if the embossed portions 13 are absent, light R3 as indicated by a dotted line from the light source 2a is totally-reflected by the flat mirror finishing portions 11, and then becomes returning light at the light incident face $S_{inb}$. Then, the light R3 is totally-reflected by one prism face of the triangular prism sequences 12. Finally, the light R3 is emitted from the light guide plate 1. Thus, the returning light R3 is emitted at a (−) angle direction of the light guide plate 1 and is, therefore, not provided for a left-eye parallax image. Note that, such light R3 is irregularly-reflected by the embossed portion 13 to prevent the light R3 from being emitted from the light guide plate 1.

Since the prisms of the triangular prism sequences 12 are required to receive light from both of the light sources 2a and 2b, each of the prisms has a cross-section of an isosceles triangle with a large apical angle such as 164°. Also, the prisms are equidistantly arranged in the triangular prism sequences 12. Note that a larger apical angle of the isosceles triangle would suppress the returning light while decreasing the amount of rising light going in the upward direction.

In FIG. 7, which illustrates a left-eye light distribution of the light guide plate 1 when the light source 2a is turned ON, a solid line indicates a left-eye light distribution where the embossed portions 13 are present, and a dotted line indicates a left-eye light distribution where the embossed portions 13 are absent. In FIG. 7, I is a luminous intensity at the light emitting face $S_{out1}$ of the light guide plate 1, and $I_0$ is a maximum value of the luminous intensity I.

As indicated by the solid line in FIG. 7, when the emitted angle θ1 is 0° to −90°, the relative luminous intensity $I/I_0$ is weakened by suppressing the returning light R3 of FIG. 6 using the embossed portions 13. Therefore, the right-eye parallax image is not affected which decreases the crosstalk between the right-eye parallax image and the left-eye parallax image. In FIG. 7, the relative luminous intensity $I/I_0$ is strong when the emitted angle θ1 is +50° to +80°. Particularly, the relative luminous intensity $I/I_0$ is maximum when the emitted angle θ1 is +64°.

Note that, when the light source 2b is turned ON, the relative luminous intensity $I/I_0$ is weakened by suppressing the returning light R3 of FIG. 6 using the embossed portions 13, when the emitted angle θ1 is 0° to −90°. Therefore, the left-eye parallax image is not affected which decreases the crosstalk between the right-eye parallax image and the left eye parallax image. Also, the relative luminous intensity $I/I_0$ is strong when the emitted angle θ1 is −50° to −80°. Particularly, the relative luminous intensity $I/I_0$ is maximum when the emitted angle θ1 is −64°.

Thus, the left-eye light distribution and the right-eye light distribution of the light guide plate 1 is symmetrical with respect to θ1=0°.

Figure 8:
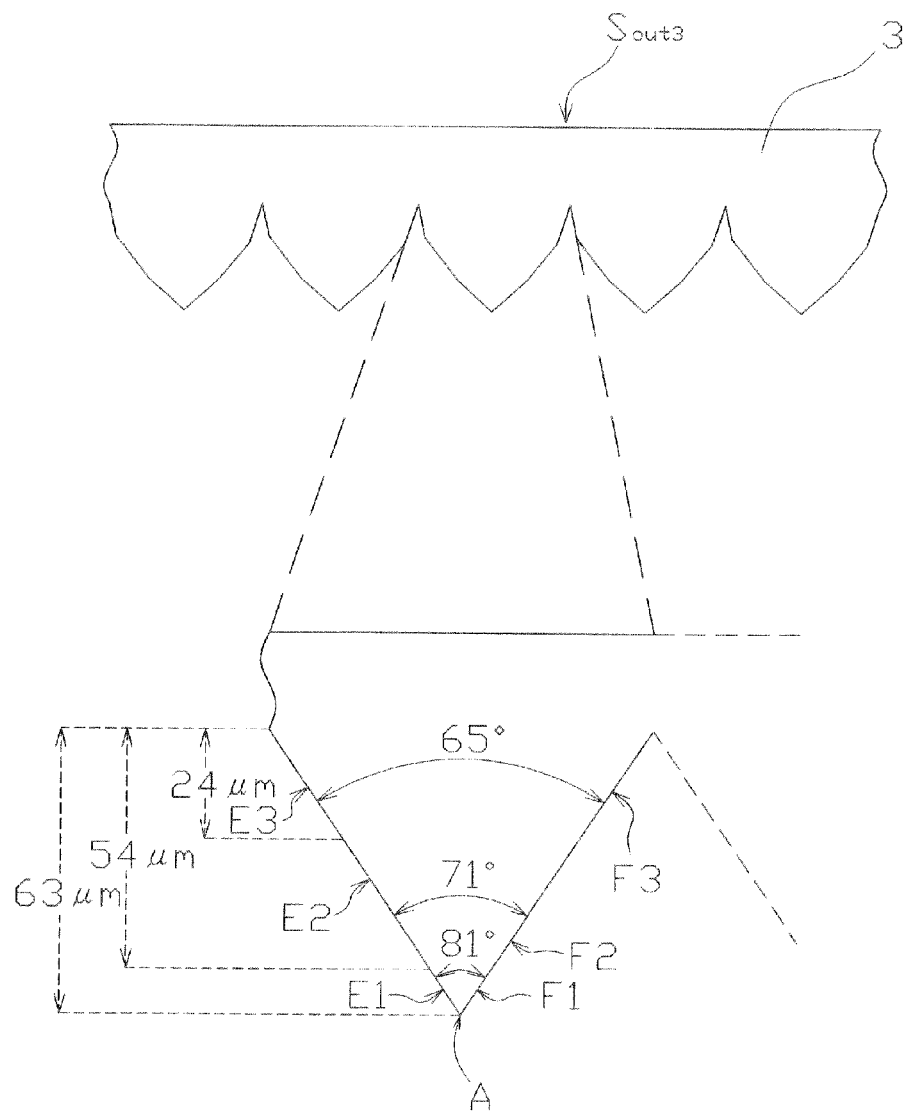
FIG. 8 is a view illustrating one prism of the single-face-deformed triangular prism sheet of FIG. 1.

In FIG. 8, which illustrates one prism of the single-face-deformed triangular prism sheet 3 of FIG. 1, this prism is a deformed triangular prism such as a three-step triangular prism which has side portions E1 and F1 at a distance of 0 μm to 9 μm from an arris A with an apical angle of 81°, side portions E2 and F2 at a distance of 9 μm to 39 μm from the arris A with an apical angle of 71°, and side portions E3 and F3 at a distance of 39 μm to 63 μm from the arris A with an apical angle of 65°. This single-face-deformed triangular prism sheet 3 can precisely be manufactured by a mold stamper.

Figure 9:
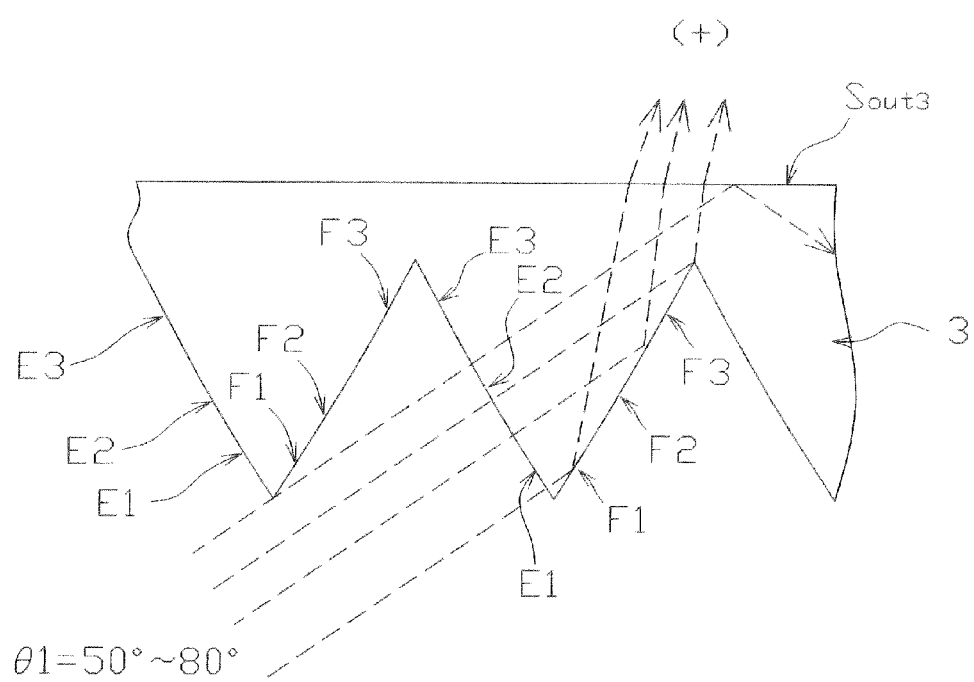
FIG. 9 is a view illustrating optical paths within the single-face-deformed triangular prism sheet of FIG. 8.

In FIG. 9, which illustrates optical paths within the single-face-deformed triangular prism sheet 3 of FIG. 8, light emitted from the light emitting face $S_{out1}$ of the light guide plate 1 is refracted at the side portions E1, E2 and E3, and then, is totally-reflected at the side portions F1, F2 and F3. Finally, the light is emitted from the light emitting face $S_{out3}$ of the single-face-deformed triangular prism sheet 3.

The optical paths within the single-face-deformed triangular prism sheet 3 when the emitted angle θ1 of the light guide plate 1 is 50°, 60°, 70° and 80°, respectively, will be explained in detail below.

Figure 10A:
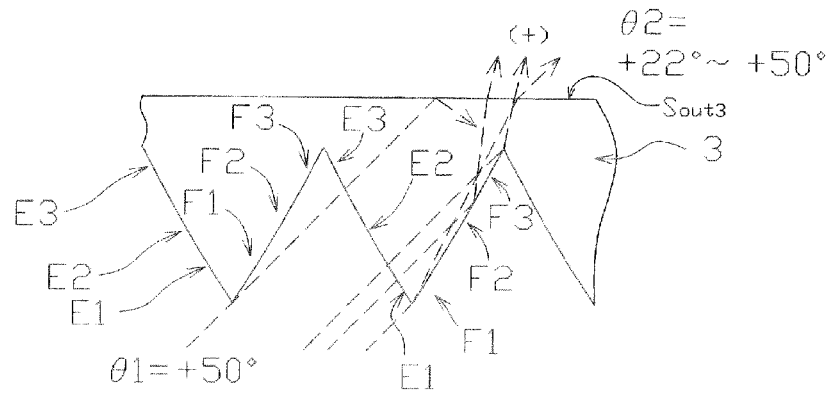
FIGS. 10A, 10B, 10C and 10D are views illustrating optical paths within the single-face-deformed triangular prism sheet of FIG. 8, when the emitted angle θ1 of the light guide plate is +50°, +60°, +70° and +80°, respectively.

As illustrated in FIG. 10A, when the emitted angle θ1 of the light guide plate 1 is +50°, light emitted from the light emitting face $S_{out1}$ of the light guide plate 1 is refracted at the side portions E1, E2 and E3, and then, is totally-reflected at the side portions F1, F2 and F3. Finally, the light is emitted from the light emitting face $S_{out3}$ of the single-face-deformed triangular prism sheet 3 at an emitted angle θ2 of +22° to +50°.

Figure 10B:
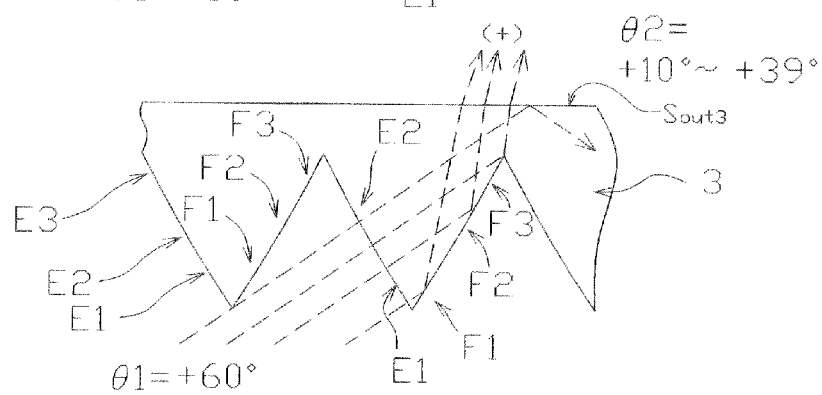

As illustrated in FIG. 10B, when the emitted angle θ1 of the light guide plate 1 is +60°, light emitted from the light emitting face $S_{out1}$ of the light guide plate 1 is refracted at the side portions E1 and E2, and then, is totally reflected at the side portions F1, F2 and F3. Finally, the light is emitted from the light emitting face $S_{out3}$ of the single-face-deformed triangular prism sheet 3 at an emitted angle θ2 of +10° to +39°.

Figure 10C:
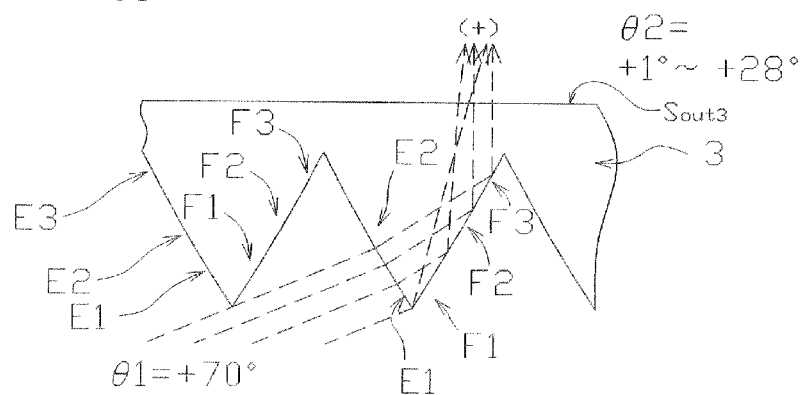

As illustrated in FIG. 10C, when the emitted angle θ1 of the light guide plate 1 is +70°, light emitted from the light emitting face $S_{out1}$ of the light guide plate 1 is refracted at the side portions E1 and E2, and then, is totally-reflected at the side portions F1, F2 and F3. Finally, the light is emitted from the light emitting face $S_{out3}$ of the single-face-deformed triangular prism sheet 3 at an emitted angle θ2 of +1° to +28°.

Figure 10D:
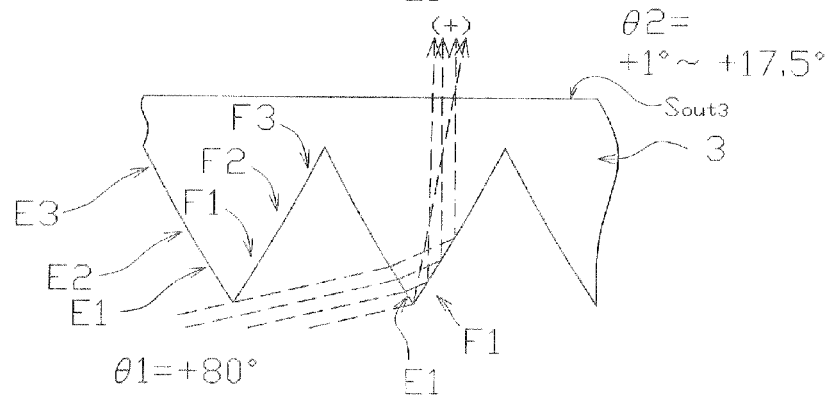

As illustrated in FIG. 10D, when the emitted angle θ1 of the light guide plate 1 is +80°, light emitted from the light emitting face $S_{out1}$ of the light guide plate 1 is refracted at the side portion E1, and then, is totally-reflected at the side portion F1. Finally, the light is emitted from the light emitting face $S_{out3}$ of the single-face-deformed triangular prism sheet 3 at an emitted angle θ2 of +1° to +17.5°.

Note that, when the emitted angle θ1 of the light guide plate 1 is 0° (vertical) to 50°, light emitted from the light guide plate 1 is refracted at the side portions E1, E2 and E3; however, the light is totally-reflected by the light emitting face $S_{out3}$ of the single-face-deformed triangular prism sheet 3 due to the light angle at the light emitting face $S_{out3}$ larger than the critical angle. Thus, the light hardly penetrates the single face-deformed triangular prism sheet 3.

Figure 11:
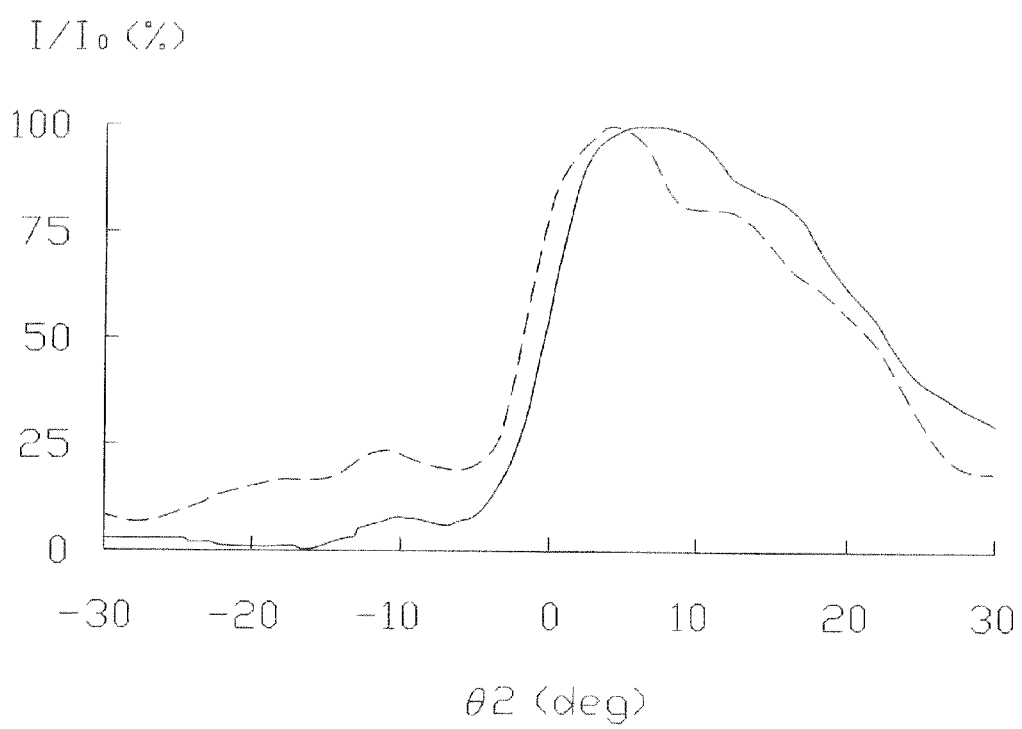

In FIG. 11, which illustrates a left-eye light distribution of the single-face-deformed triangular prism sheet 3 when the light source 2a is turned ON, a solid line indicates a left-eye light distribution where the embossed portions 13 are present, and a dotted line indicates a left-eye light distribution where the embossed portions 13 are absent. In FIG. 11, I is a luminous intensity at the light emitting face $S_{out3}$ of the single-face-deformed triangular prism sheet 3, and $I_0$ is a maximum value of the luminous intensity I.

As indicated by the solid line in FIG. 11, when the emitted angle θ2 of the single-face-deformed triangular prism sheet 3 is 0° to −30°, the relative luminous intensity $I/I_0$ is weakened by suppressing the returning light R3 of FIG. 6 using the embossed portions 13. Therefore, the right-eye parallax image is not affected which decreases the crosstalk between the right-eye parallax image and the left-eye parallax image. In FIG. 11, the relative luminous intensity $I/I_0$ is strong when the emitted angle θ2 is 0° to +30°, while the relative luminous intensity $I/I_0$ is very weak when the emitted angle θ2 is 0° to −30°.

Note that, when the light source 2b is turned ON, the relative luminous intensity $I/I_0$ is weakened by suppressing the returning light R3 of FIG. 6 using the embossed portions 13, when the emitted angle θ2 is 0° to +30°. Therefore, the left-eye parallax image is not affected which decreases the crosstalk between the right eye parallax image and the left-eye parallax image. Also, the relative luminous intensity $I/I_0$ is strong when the emitted angle $\theta 2$ is 0° to −30°.

Thus, the left-eye light distribution and the right-eye light distribution of the single-face-deformed triangular prism sheet 3 is symmetrical with respect to $\theta 2=0°$.

In the above-described first embodiment, the width of the flat mirror finishing portions 11 is definite; however, the width of the flat mirror finishing portions 11 can be changed. Even in this case, the light guide plate 1 is symmetrical with respect to a center face between the light incident faces $S_{ina}$ and $S_{inb}$.

Also, the single-face-deformed triangular prism sheet 3 is made of a single material; however, the single-face-deformed triangular prism sheet 3 can be made of two or more different materials stacked on each other. Further, the single-face-deformed triangular prism sheet 3 can be a two-step or four-step triangular prism.

Figure 12:
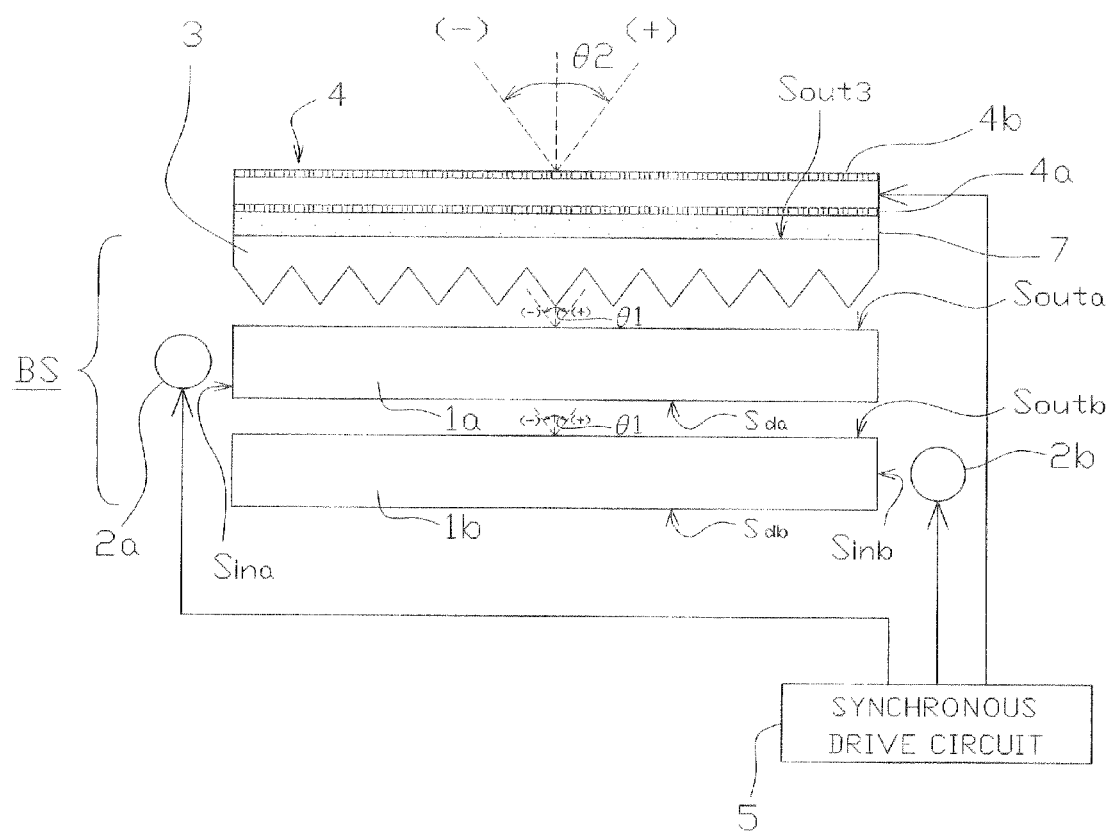
FIG. 12 is a view illustrating a second embodiment of the non-spectacled stereoscopic display apparatus according to the presently disclosed subject matter.

In FIG. 12, which illustrates a second embodiment of the non-spectacled stereoscopic display apparatus according to the presently disclosed subject matter, two light guide plates 1a and 1b are provided instead of the light guide plate 1 of FIG. 1. The light guide plate 1a has a light distributing face $S_{da}$ and a light emitting face $S_{outa}$, and the light guide plate 1b has a light distributing face $S_{db}$ and a light emitting face $S_{outb}$. The light distributing face $S_{da}$ of the light guide plate 1a opposes the light emitting face $S_{outb}$ of the light guide plate 1b. Also, the light source 2a is disposed on the side of a light incident face $S_{ina}$ of the light guide plate 1a, and the light source 2b is disposed on the side of a light incident face $S_{inb}$ of the light guide plate 1b. Further, the single-face-deformed triangular prism sheet 3 is disposed on the light emitting face $S_{outa}$ of the light guide plate 1a. Thus, in the same way as in the non-spectacled stereoscopic display apparatus of FIG. 1, a stereoscopic image with the same number of pixels as that of the transmissive liquid crystal display panel 4 can be displayed.

Figure 13A:
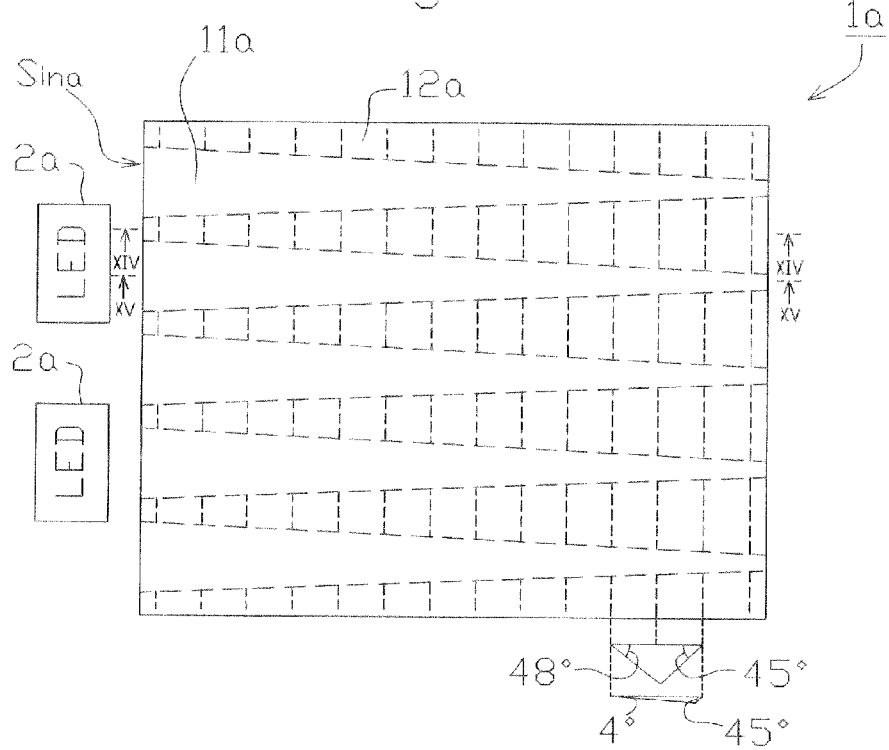
FIGS. 13A and 13B are plan views illustrating examples of the light guide plates of FIG. 12.
Figure 13B:
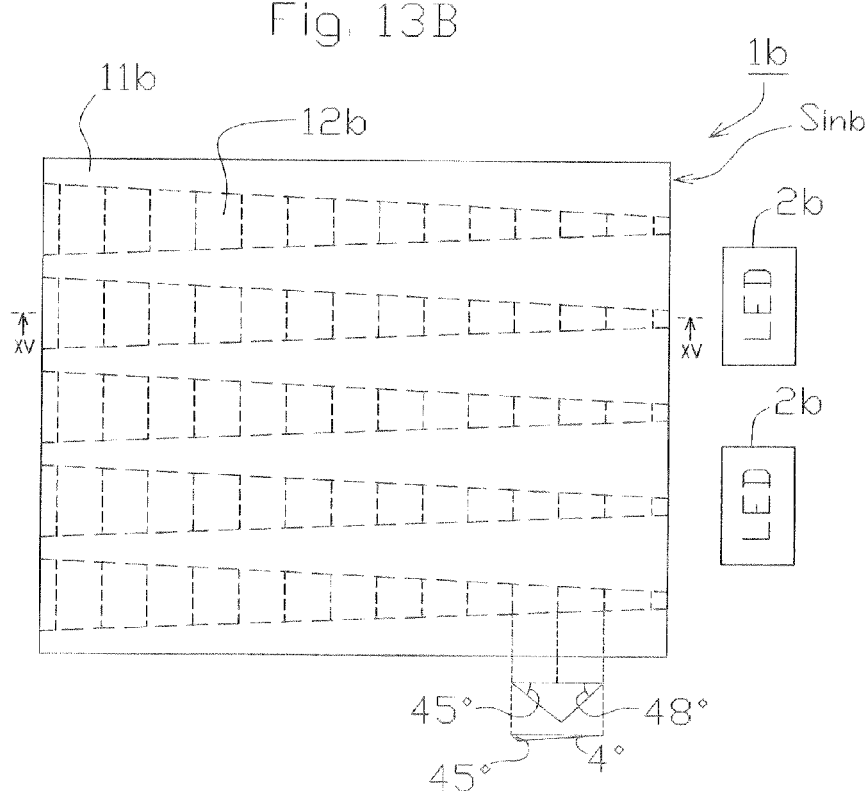

In FIGS. 13A and 13B, which illustrate examples of the light guide plates 1a and 1b, respectively, of FIG. 12, the light guide plates 1a and 1b are made of a transmissive material such as acryl resin or polycarbonate resin.

As illustrated in FIG. 13A, a plurality of flat mirror finishing portions 11a are provided on the light distributing face $S_{da}$ of the light guide plate 1a and extend from the light incident face $S_{ina}$. The flat mirror finishing portions 11a serve as means for spreading light to the inner part of the light guide plate 1a. In this case, the farther from the light incident face $S_{ina}$ a location of the flat mirror finishing portions 11a, the smaller the width of the flat mirror finishing portions 11a at that location. A plurality of triangular prism sequences 12a are provided on areas of the light distributing face $S_{da}$ of the light guide plate 1a where the flat mirror finishing portions 11a are not provided. Each of the triangular prism sequences 12a includes a plurality of equidistantly-arranged triangular prisms for bending the path of light. In this case, the farther from the light incident face $S_{ina}$ a location of the triangular prism sequence 12a, the larger the width of the triangular prism sequence 12a at that location. Thus, much more light is totally-reflected by the triangular prism sequences 12a, to realize a uniform surface-emission.

In FIG. 13A, each triangular prism of the triangular prism sequences 12a is asymmetrical, i.e., a slope angle on the side of the light source 2a is 45° to 50°, preferably, 48°, and a slope angle on the opposite side of the light source 2a is 42° to 48°, preferably, 45°. Note that the light source 2a can be formed by a plurality of LEDs opposing the flat mirror finishing portions 11a, to spread light to the inner part of the light guide plate 1a through the flat mirror finishing portions 11a.

Similarly, as illustrated in FIG. 13B, a plurality of flat mirror finishing portions 11b are provided on the light distributing face $S_{db}$ of the light guide plate 1b and extend from the light incident face $S_{inb}$. The flat mirror finishing portions 11b serve as means for spreading light to the inner part of the light guide plate 1b. In this case, the farther from the light incident face $S_{inb}$ a location of the flat mirror finishing portions 11b, the smaller the width of the flat mirror finishing portions 11b at that location. A plurality of triangular prism sequences 12b are provided on areas of the light distributing face $S_{db}$ of the light guide plate 1b where the flat mirror finishing portions 11b are not provided. Each of the triangular prism sequences 12b includes a plurality of equidistantly-arranged triangular prisms for standing light. In this case, the farther from the light incident face $S_{inb}$ a location of the triangular prism sequence 12b, the larger the width of the triangular prism sequence 12b at that location. Thus, much more light is totally-reflected by the triangular prism sequences 12b, to realize a uniform surface-emission.

In FIG. 13B, each triangular prism of the triangular prism sequences 12b is asymmetrical, i.e., a slope angle on the side of the light source 2b is 45° to 50°, preferably, 48°, and a slope angle on the opposite side of the light source 2b is 42° to 48°, preferably, 45°. Note that the light source 2b can be formed by a plurality of LEDs opposing the flat mirror finishing portions 11b, to spread light to the inner part of the light guide plate 1b through the flat mirror finishing portions 11b.

When the light guide plate 1a as illustrated in FIG. 13A is superposed onto the light guide plate 1b as illustrated in FIG. 13B, the triangular prism sequence 12a of the light guide plate 1a entirely opposes the flat mirror finishing portions 11b of the light guide plate 1b, while the triangular prism sequence 12b of the light guide plate 1b entirely opposes the flat mirror finishing portions 11a of the light guide plate 1a. As a result, light emitted from the light emitting face $S_{outb}$ of the light guide plate 1b is not affected by the pattern of the light guide plate 1a to pass therethrough. Of course, light emitted from the light emitting face $S_{outa}$ of the light guide plate 1a is not affected by the pattern of the light guide plate 1b.

Figure 14A:
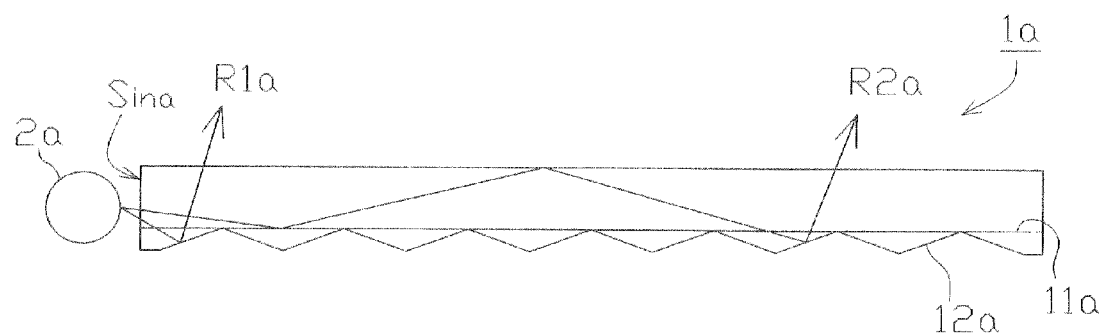
FIGS. 14A and 14B are cross-sectional views taken along the line XIV-XIV in FIG. 13A.
Figure 14B:
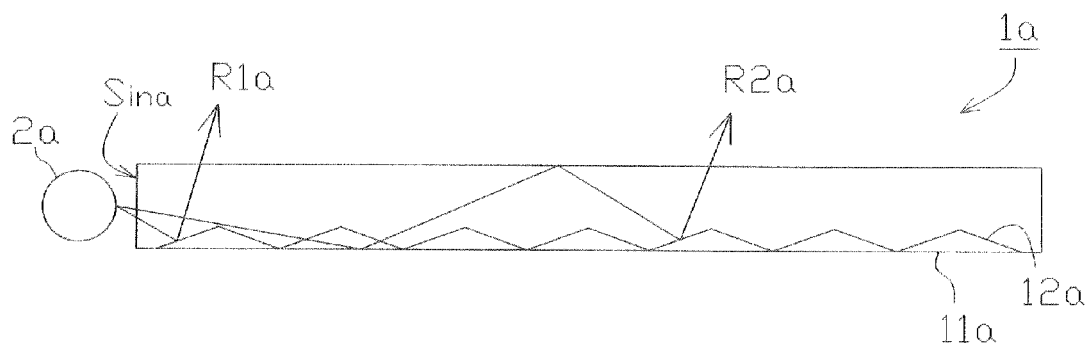

FIGS. 14A and 14B are cross-sectional views taken along the line XIV-XIV in FIG. 13A.

As illustrated in FIG. 14A, the triangular prism sequences 12a may be protruded from the flat mirror finishing portions 11a. Also, as illustrated in FIG. 14B, the flat mirror finishing portions 11a may be protruded from the triangular prism sequences 12a. In FIGS. 14A and 14B, only the light source 2a is turned ON.

In FIGS. 14A and 14B, light R1a as indicated by a solid line from the light source 2a is totally-reflected directly by one prism face of the triangular prism sequences 12a, and then, is emitted from the light guide plate 1a. Also, light R2a as indicated by another solid line from the light source 2a is totally-reflected by one of the flat mirror finishing portions 11a, and then, is totally-reflected by one prism face of the triangular prism sequences 12a. Finally, the light R2a is emitted from the light guide plate 1a. Thus, the lights R1a and R2a are emitted at a (+) angle direction of the light guide plate 1a and are, therefore, provided for a left-eye parallax image. Also, little light is emitted at a (−) angle direction which decreases the crosstalk between the right-eye parallax image and the left-eye parallax image.

Figure 15A:
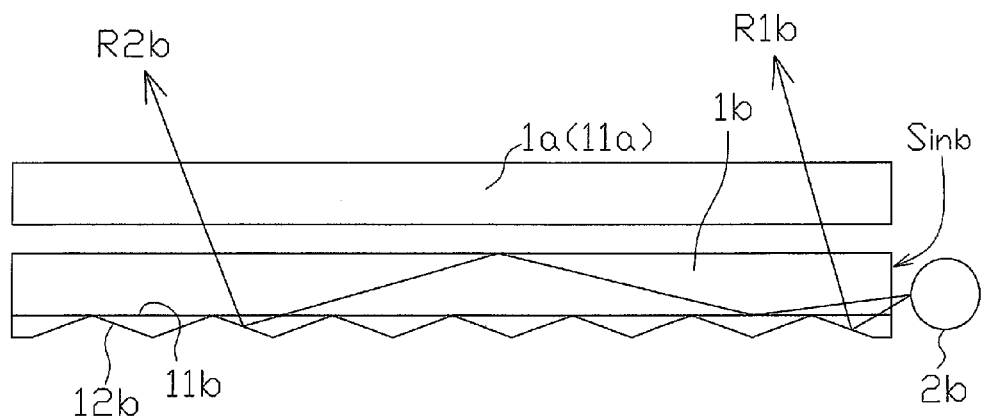
FIGS. 15A and 15B are cross-sectional views taken along the line XV-XV in FIGS. 13A and 13B, when the light guide plate of FIG. 13A is superposed onto the light guide plate of FIG. 13B.
Figure 15B:
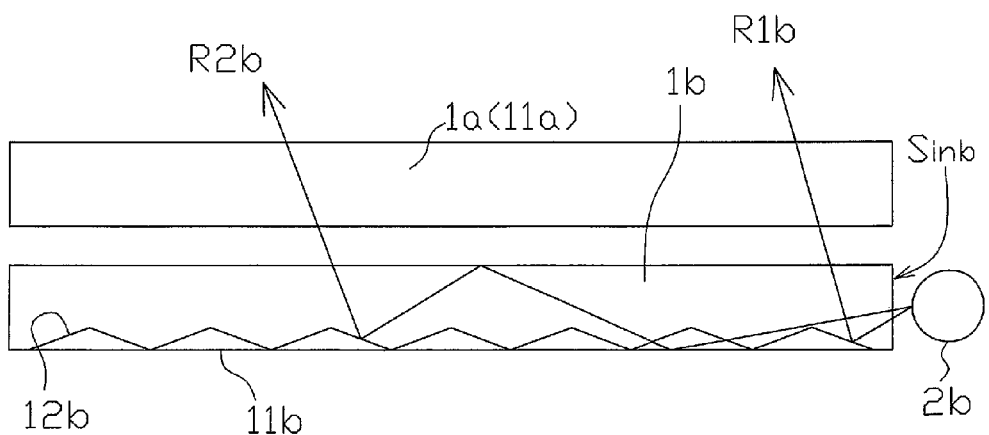

FIGS. 15A and 15B are cross-sectional views taken along the line XV-XV in FIGS. 13A and 13B, when the light guide plate 1a of FIG. 13A is superposed onto the light guide plate 1b of FIG. 13B.

As illustrated in FIG. 15A, the triangular prism sequences 12b may be protruded from the flat mirror finishing portions 11b. Also, as illustrated in FIG. 15B, the flat mirror finishing portions 11b may be protruded from the triangular prism sequences 12b. In FIGS. 15A and 15B, only the light source 2b is turned ON.

In FIGS. 15A and 15B, light R1b as indicated by a solid line from the light source 2b is totally-reflected directly by one prism face of the triangular prism sequences 12b, and then, is emitted from the light guide plate 1b to pass through one of the flat mirror finishing portions 11a of the light guide plate 1a. Also, light R2b as indicated by another solid line from the light source 2b is totally-reflected by one of the flat mirror finishing portions 11b, and then, is totally-reflected by one prism face of the triangular prism sequences 12b to pass through one of the flat mirror finishing portions 11a of the light guide plate 1a. Finally, the light R2b is emitted from the light guide plate 1a. Thus, the lights R1b and R2b are emitted at a (−) angle direction of the light guide plate 1a and are, therefore, provided for a right-eye parallax image. Also, little light is emitted at a (+) angle direction which decreases the crosstalk between the right-eye parallax image and the left-eye parallax image.

Figure 16:
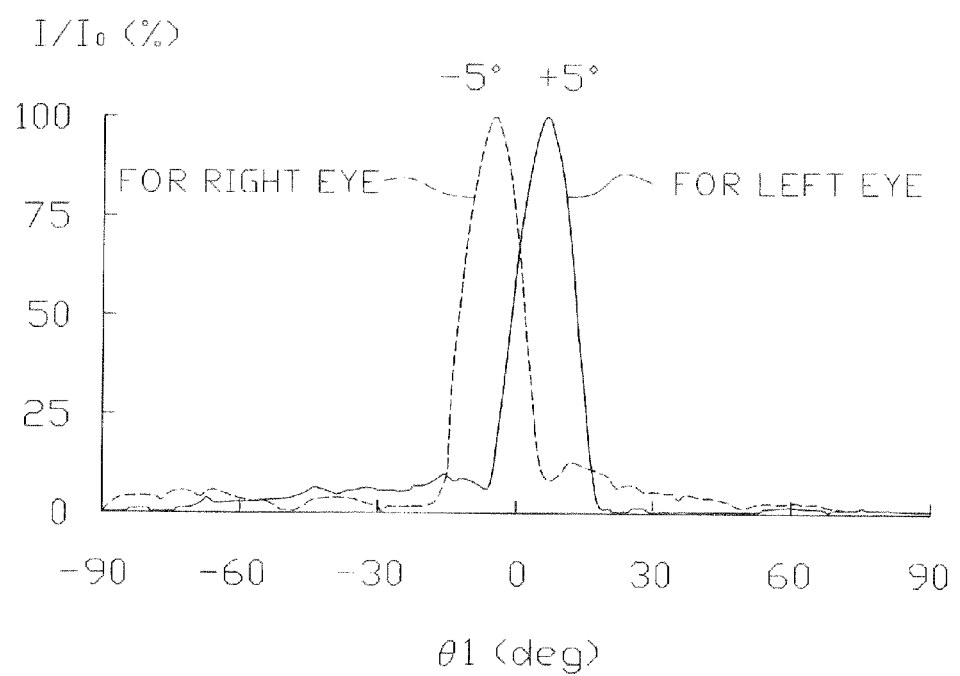
FIG. 16 is a graph illustrating a left-eye light distribution of the left-eye light guide plate of FIG. 12 and a right eye light distribution of the right-eye light guide plate of FIG. 12.

In FIG. 16, which illustrates a left-eye light distribution of the light guide plate 1a of FIG. 12 when the light source 2a is turned ON and a right-eye light distribution of the light guide plate 1b of FIG. 12 when the light source 2b is turned ON, as indicated by a solid line, when the emitted angle θ1 of the light guide plate 1a is 0° to −90°, the relative luminous intensity $I/I_0$ is weakened, so that the right-eye parallax image is not affected which decreases the crosstalk between the right-eye parallax image and the left-eye parallax image. Also, as indicated by a dotted line, when the emitted angle θ1 of the light guide plate 1b is 0° to +90°, the relative luminous intensity $I/I_0$ is weakened, so that the left-eye parallax image is not affected which decreases the crosstalk between the right-eye parallax image and the left-eye parallax image.

When the light guide plate 1a of FIG. 12 is changed in such a way that each triangular prism of the triangular prism sequences 12a is asymmetrical, i.e., a slope angle on the side of the light source 2a is 1° to 8°, preferably, 4° (see: FIG. 13A), and a slope angle on the opposite side of the light source 2a is 10° to 90°, preferably, 45° (see: FIG. 13A), and the light guide plate 1b of FIG. 12 is changed in such a way that each triangular prism of the triangular prism sequences 12b is asymmetrical, i.e., a slope angle on the side of the light source 2b is 1° to 8°, preferably, 4° (see: FIG. 13B), and a slope angle on the opposite side of the light source 2b is 10° to 90°, preferably, 45° (see: FIG. 13B), a left-eye light distribution of the light guide plate 1a when the light source 2a is turned ON and a right-eye light distribution of the light guide plate 1b when the light source 2b is turned ON are illustrated in FIG. 17.

Figure 17:
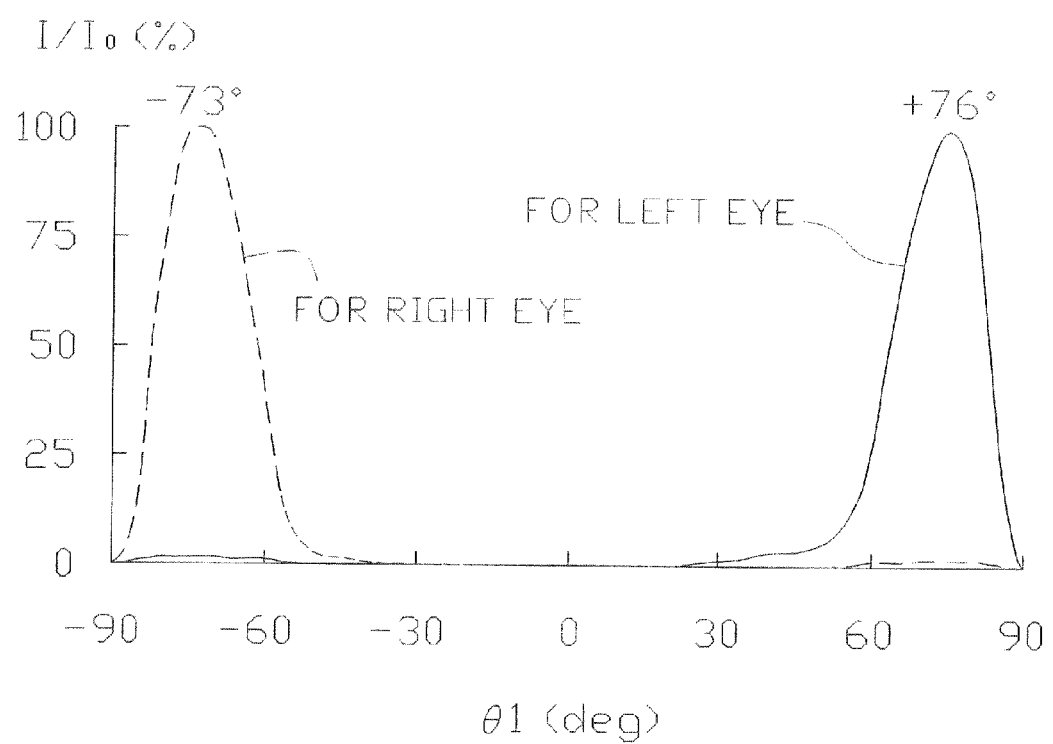
FIG. 17 is another graph illustrating a left-eye light distribution of the left-eye light guide plate of FIG. 12 and a right-eye light distribution of the right-eye light guide plate of FIG. 12.

In FIG. 17, the left-eye light distribution emitted from the light guide plate 1a as indicated by a solid line has a maximum (peak) luminous intensity at an emitted angle θ1 of +76°, while the right-eye light distribution emitted from the light guide plate 1b as indicated by a dotted line has a maximum (peak) luminous intensity at an emitted angle θ1 of −73°. The difference between the two peak intensities is 149°. Thus, the left-eye light distribution as indicated by the solid line is asymmetrical with the right-eye light distribution due to the face that the distance between the light, guide plate 1a and the single-face-deformed triangular prism sheet 3 is smaller than the distance between the light guide plate 1b and the single-face-deformed triangular prism sheet 3 and that the emitted light of the light guide plate 1b passes through the light guide plate 1a whose refractive index is different from that of air.

The asymmetrical left-eye and right-eye light distributions as illustrated in FIG. 17 with a large peak difference of 149° are transformed by the single-face-deformed triangular prism sheet 3 into symmetrical left-eye and right-eye light distributions with a small peak difference.

Figure 18A:
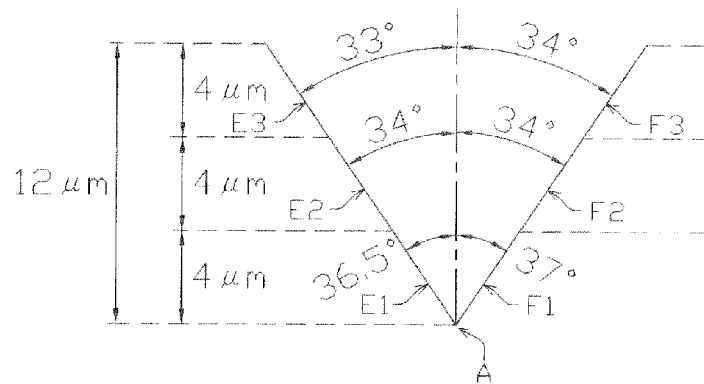
FIG. 18A is a view illustrating one prism of the single-face-deformed triangular prism sheet of FIG. 12.
Figure 18B:
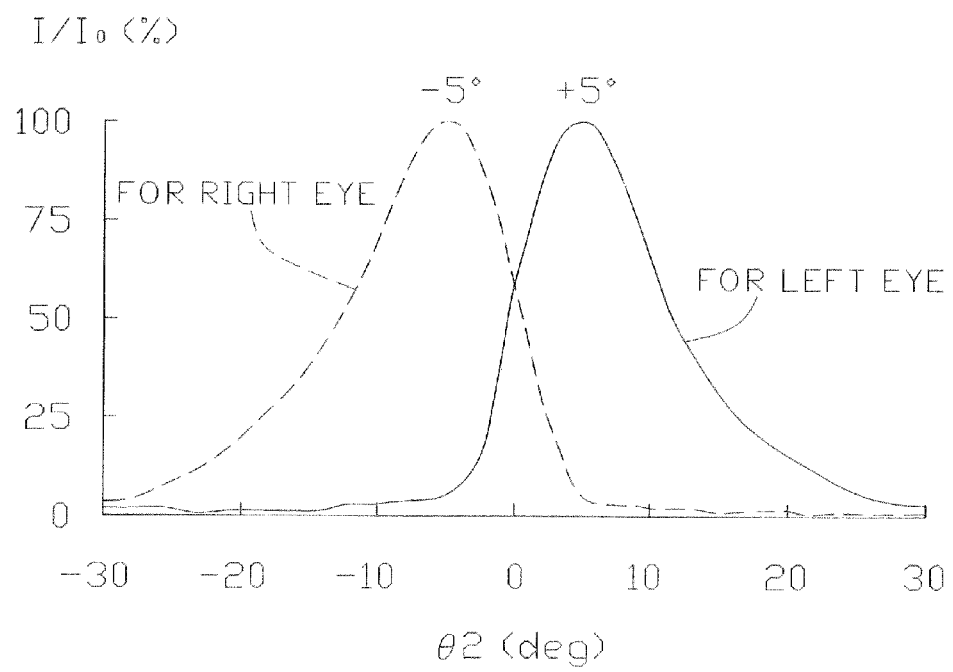
FIG. 18B is a graph illustrating a left-eye light distribution and a right-eye light distribution of the single-face-deformed triangular prism sheet of FIG. 12.

In order to transform the asymmetrical left-eye and right-eye light distributions into the symmetrical left-eye and right-eye light distributions, each prism of the single-face-deformed triangular prism sheet 3 is made asymmetrical as illustrated in FIG. 18A. That is, each prism is a deformed asymmetrical triangular prism such as a three-step triangular prism which has side portions E1 and F1 at a distance of 0 μm to 4 μm from an arris A with an apical angle of 36.5°+37°, side portions E2 and F2 at a distance of 4 μm to 8 μm from the arris A with an apical angle of 34°+34°, and side portions E3 and F3 at a distance of 8 μm to 12 μm from the arris A with an apical angle of 33°+34°. This single-face-deformed triangular prism sheet 3 can precisely be manufactured by a mold stamper. As a result, as illustrated in FIG. 18B, the peak angle of the left-eye light distribution is +5°, while the peak angle of the right-eye light distribution is −5°, thus realizing a small peak difference of 10°. Also, the left-eye and right-eye light distributions are almost symmetrical with respect to θ2=0°.

Thus, the sharp left-eye and right-eye light distributions symmetrical with each other having a small peak difference can be obtained by the single-face-deformed triangular prism sheet 3 with stepped asymmetrical prisms, thus decreasing the crosstalk between the left-eye parallax image and the right-eye parallax image.

Note that the number of steps and the apical angles of the prisms of the single-face-deformed triangular prism sheet 3 may be changed, as occasion demands. Even in this case, if the apical angles of the prisms of the single-face-deformed triangular prism sheet 3 are too small, the peak difference is brought close to 0°, which makes the stereoscopic display impossible. Contrary to this, if the apical angles of the prisms of the single-face-deformed triangular prism sheet 3 are too large, the peak difference is large, which also makes the stereoscopic display impossible.

Figure 19:
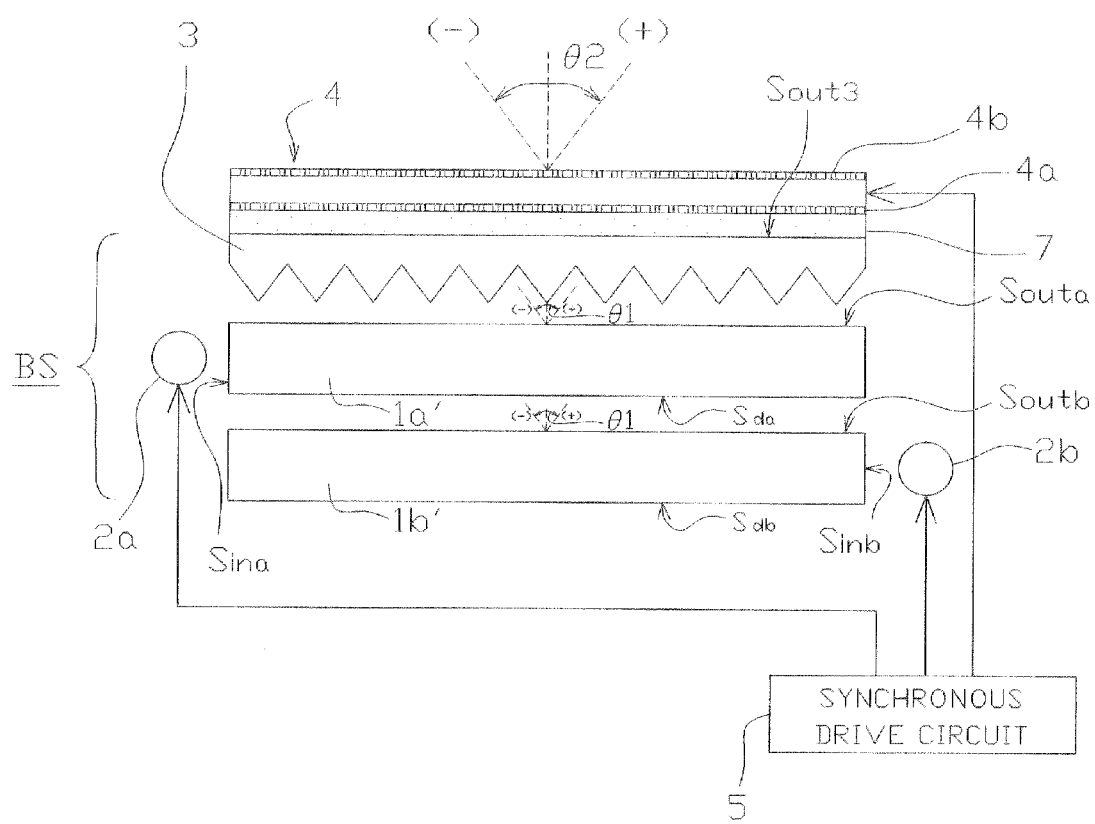
FIG. 19 is a view illustrating a third embodiment of the non-spectacled stereoscopic display apparatus according to the presently disclosed subject matter.

In FIG. 19, which illustrates a third embodiment of the non-spectacled stereoscopic display apparatus according to the presently disclosed subject matter, two light guide plates 1a' and 1b' are provided instead of the light guide plates 1a and 1b of FIG. 12.

In FIGS. 20A and 20B, which illustrate examples of the light guide plates 1a' and 1b', respectively, of FIG. 19, the light guide plates 1a' and 1b' are made of a transmissive material such as acryl resin or polycarbonate resin.

As illustrated in FIG. 20A, a mirror finishing portion 11a' is provided on the light distributing face $S_{da}$ of the light guide plate 1a' and extend from the light incident face $S_{ina}$. The flat mirror finishing portion 11a' serves as means for spreading light to the inner part of the light guide plate 1a'. A plurality of dot-shaped prism sequences 12a' are provided on areas of the light distributing face $S_{da}$ of the light guide plate 1a' where the flat mirror finishing portion 11a' is not provided. Each of the dot-shaped prism sequences 12a' includes a plurality of triangular or circular dot-shaped prisms for standing bending the path of light. In this case, each dot-shaped prism of the dot-shaped prism sequences 12a' is asymmetrical, i.e., a slope angle on the side of the light source 2a is 45° to 50°, preferably, 48°, and a slope angle on the opposite side of the light source 2a is 42° to 48°, preferably, 45°.

Similarly, as illustrated in FIG. 20B, a flat mirror finishing portions 11b' is provided on the light distributing face $S_{db}$ of the light guide plate 1b' and extend from the light incident face $S_{inb}$. The flat mirror finishing portion 11b' serves as means for spreading light to the inner part of the light guide plate 1b'. A plurality of dot-shaped prism sequences 12b' are provided on areas of the light distributing face $S_{db}$ of the light guide plate 1b' where the flat mirror finishing portion 11b' is not provided. Each of the dot-shaped prism sequences 12b' includes a plurality of triangular or circular dot-shaped prisms for standing light. In this case, each dot-shaped prism of the dot-shaped prism sequences 12b' is asymmetrical, i.e., a slope angle on the side of the light source 2b is 45° to 50°, preferably, 48°, and a slope angle on the opposite side of the light source 2b is 42° to 48°, preferably, 45°.

FIGS. 21A and 21B illustrate other examples of the light guide plates 1a' and 1b', respectively, of FIG. 19.

As illustrated in FIG. 21A, the farther from the light incident face $S_{ina}$ a location of a dot-shaped prism of the dot-shaped prism sequences 12a', the larger the width of the dot-shaped prism of the dot-shaped prism sequences 12a' at that location. Thus, much more light is totally-reflected by the dot-shaped prism sequences 12a', to realize a uniform surface-emission.

Similarly, as illustrated in FIG. 21B, the farther from the light incident face $S_{inb}$ a location of a dot-shaped prism of the dot-shaped prism sequences 12b', the larger the width of the dot-shaped prism of the dot-shaped prism sequence 12b' at that location. Thus, much more light is totally-reflected by the dot-shaped prism sequences 12b', to realize a uniform surface-emission.

When the light guide plate 1a' as illustrated in FIG. 20A (FIG. 21A) is superposed onto the light guide plate 1b' as illustrated in FIG. 20B (FIG. 21B), the dot-shaped prism sequences 12a' of the light guide plate 1a' partly oppose the flat mirror finishing portion 11b' of the light guide plate 1b', while the dot-shaped prism sequence 12b' of the light guide plate 1b' partly oppose the flat mirror finishing portion 11a' of the light guide plate 1a'. As a result, light emitted from the light emitting face $S_{outb}$ of the light guide plate 1b' is not affected by the pattern of the light guide plate 1a' to pass therethrough. Of course, light emitted from the light emitting face $S_{outa}$ of the light guide plate 1a' is not affected by the pattern of the light guide plate 1b'.

Figure 22A:
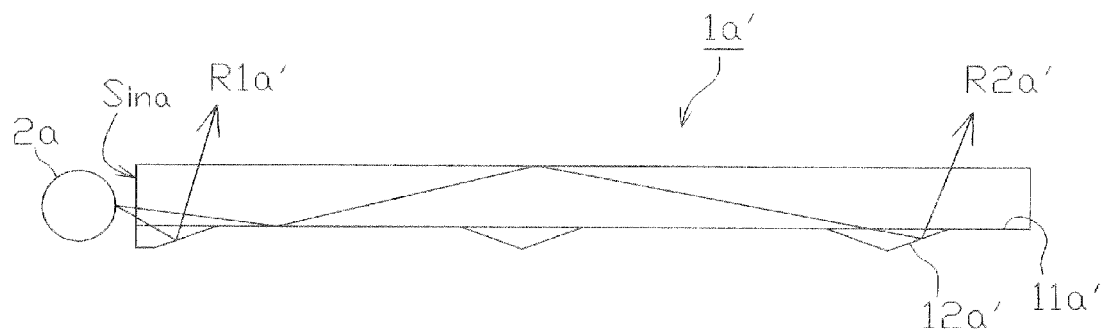
FIGS. 22A and 22B are cross-sectional views taken along the line XXII-XXII in FIG. 20A (FIG. 21A)
Figure 22B:
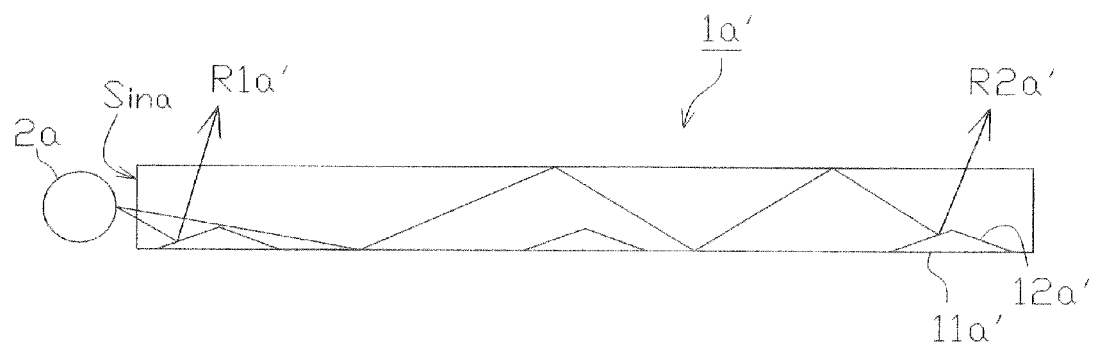

FIGS. 22A and 22B are cross-sectional views taken along the line XXII-XXII in FIG. 20A (FIG. 21A).

As illustrated in FIG. 22A, the dot-shaped prism sequences 12a' may be protruded from the flat mirror finishing portion 11a'. Also, as illustrated in FIG. 22B, the flat mirror finishing portion 11a' may be protruded from the dot-shaped prism sequences 12a'. In FIGS. 22A and 22B, only the light source 2a is turned ON.

In FIGS. 22A and 22B, light R1a' as indicated by a solid line from the light source 2a is totally-reflected directly by one prism face of the dot-shaped prism sequences 12a', and then, is emitted from the light guide plate 1a'. Also, light R2a' as indicated by another solid line from the light source 2a is totally-reflected by the flat mirror finishing portion 11a', and then, is totally-reflected by one prism face of the dot-shaped prism sequences 12a'. Finally, the light R2a' is emitted from the light guide plate 1a'. Thus, the lights R1a' and R2a' are emitted at a (+) angle direction of the light guide plate 1a' and are, therefore, provided for a left-eye parallax image. Also, little light is emitted at a (−) angle direction which decreases the crosstalk between the right-eye parallax image and the left-eye parallax image.

Figure 23A:
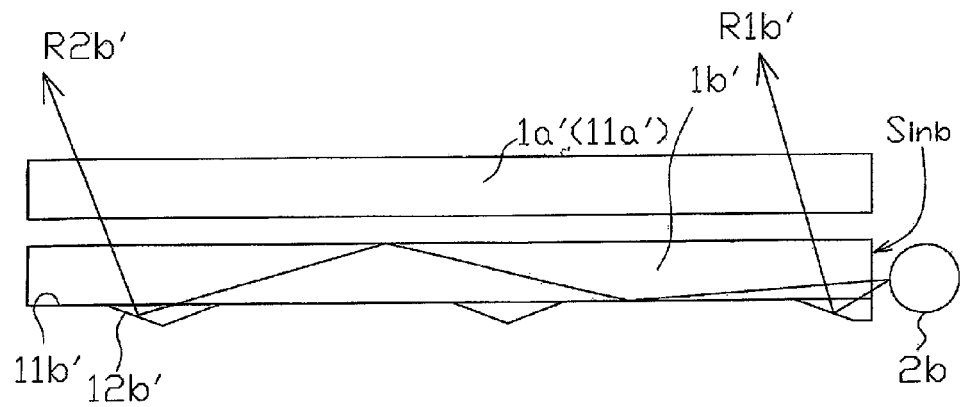
FIGS. 23A and 23B are cross-sectional views taken along the line XXIII-XXIII in FIGS. 20A and 20B (FIGS. 21A and 21B), when the light guide plate of FIG. 20A (FIG. 21A) is superposed onto the light guide plate of FIG. 20B (FIG. 21B)
Figure 23B:
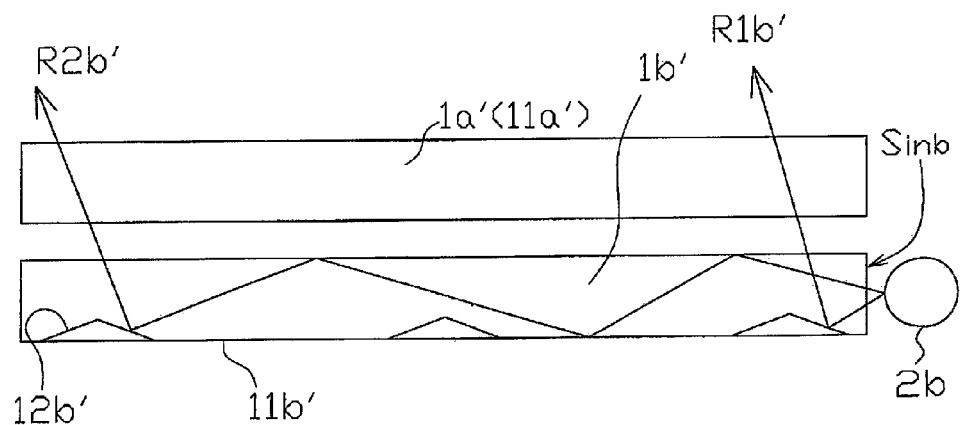

FIGS. 23A and 23B are cross-sectional views taken along the line XXIII-XXIII in FIGS. 20A and 20B (FIGS. 21A and 21B), when the light guide plate 1a' of FIG. 20A (FIG. 21A) is superposed onto the light guide plate 1b' of FIG. 20B (FIG. 21B).

As illustrated in FIG. 23A, the dot-shaped prism sequences 12b' may be protruded from the flat mirror finishing portion 11b'. Also, as illustrated in FIG. 23B, the flat mirror finishing portion 11b' may be protruded from the dot-shaped prism sequences 12b'. In FIGS. 23A and 23B, only the light source 2b is turned ON.

In FIGS. 23A and 23B, light R1b' as indicated by a solid line from the light source 2b is totally-reflected directly by one prism face of the dot-shaped prism sequences 12b', and then, is emitted from the light guide plate 1b' to pass through the flat mirror finishing portion 11a' of the light guide plate 1a'. Also, light R2b' as indicated by another solid line from the light source 2b is totally-reflected by the flat mirror finishing portion 11b', and then, is totally-reflected by one prism face of the dot-shaped prism sequences 12b' to pass through the flat mirror finishing portion 11a' of the light guide plate 1a'. Finally, the light R2b' is emitted from the light guide plate 1a'. Thus, the lights R1a' and R2b' are emitted at a (−) angle direction of the light guide plate 1a' and are, therefore, provided for a right-eye parallax image. Also, little light is emitted at a (+) angle direction which decreases the crosstalk between the right-eye parallax image and the left-eye parallax image.

Figure 24:
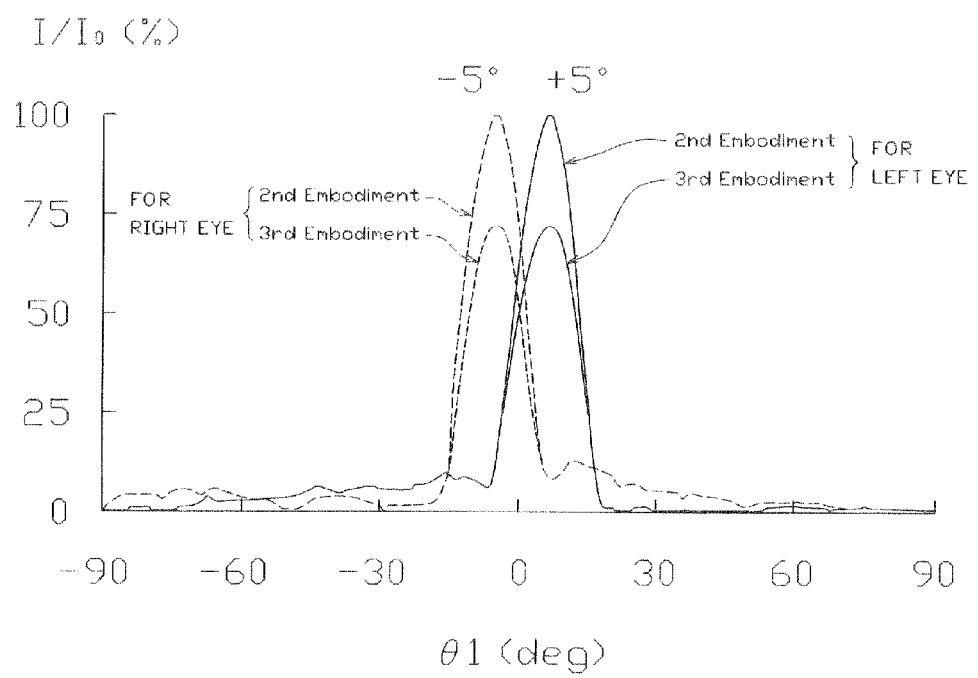

In FIG. 24, which illustrates a left-eye light distribution of the light guide plate 1a' of FIG. 19 when the light source 2a is turned ON and a right-eye light distribution of the light guide plate 1b' of FIG. 19 when the light source 2b is turned ON, as indicated by a solid line, when the emitted angle θ1 of the light guide plate 1a' is 0° to −90°, the relative luminous intensity $I/I_0$ is weakened, so that the right-eye parallax image is not affected which decreases the crosstalk between the right-eye parallax image and the left-eye parallax image. Also, as indicated by a dotted line, when the emitted angle θ1 of the light guide plate 1b' is 0° to +90°, the relative luminous intensity $I/I_0$ is weakened, so that the left-eye parallax image is not affected which decreases the crosstalk between the right-eye parallax image and the left-eye parallax image.

When the light guide plate 1a' of FIG. 19 is changed in such a way that each dot-shaped prism of the dot-shaped prism sequences 12a' is asymmetrical, i.e., a slope angle on the side of the light source 2a is 1° to 8°, preferably, 4° (see: FIGS. 20A and 21A), and a slope angle on the opposite side of the light source 2a is 10° to 90°, preferably, 45° (see: FIGS. 20A and 21A), and the light guide plate 1b' of FIG. 19 is changed in such a way that each triangular dot-shaped prism of the triangular dot-shaped prism sequences 12b is asymmetrical, i.e., a slope angle on the side of the light source 2b is 1° to 8°, preferably, 4° (see: FIGS. 20B and 21B), and a slope angle on the opposite side of the light source 2b is 10° to 90°, preferably, 45° (see: FIGS. 20B and 21B), a left-eye light distribution of the light guide plate 1a' when the light source 2a is turned ON and a right-eye light distribution of the light guide plate 1b' when the light source 2b is turned ON are illustrated in FIG. 24. In the above-described third embodiment, the triangular or circular dot-shaped prisms can be trapezoidal or circularly-trapezoidal.

Also, in the above-described embodiments, the light guide plates can be wedged.

It will be apparent to those skilled in the art that various modifications and variations can be made in the presently disclosed subject matter without departing from the spirit, or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background portion of the present specification are hereby incorporated in their entirety by reference.

The invention claimed is:

1. A non-spectacled stereoscopic display apparatus comprising:
   a light guide plate having a light distributing face, a light emitting face opposing said light distributing face, and first and second light incident faces opposing each other on sides of said light distributing face and said light emitting face;
   first and second light sources disposed on the first and second light incident faces, respectively, of said light guide plate;
   a single-face prism sheet disposed on the light emitting face of said light guide plate;
   a transmissive display panel disposed on a light emitting face of said single-face prism sheet with no air gap therebetween, said transmissive display panel having a polarizing plate opposing the light emitting face of said single-face prism sheet; and
   a synchronous drive circuit adapted to synchronize said first and second light sources to display parallax images on said transmissive display panel,
   wherein a polarizing direction of polarization anisotropy of the light emitting face of said single-face prism sheet coincides with a polarizing direction of said polarizing plate, and coincides with a line perpendicular to a direction of optical axes of said first and second light sources, so that a luminous intensity at a light emitting face of said transmissive display panel relative to a luminous intensity at a light incident face of said transmissive display panel is maximum.

2. The non-spectacled stereoscopic display apparatus as set forth in claim 1, further comprising a contact layer disposed between said single-face prism sheet and said transmissive display panel.

3. The non-spectacled stereoscopic display apparatus as set forth in claim 2, wherein said contact layer comprises:
   a base; and
   an adhesive layer coated on said base.

4. The non-spectacled stereoscopic display apparatus as set forth in claim 2, wherein said contact layer comprises an adhesive layer coated on said single-face prism sheet.

5. A non-spectacled stereoscopic display apparatus comprising:
   a first light guide plate having a first light distributing face, a first light emitting face opposing said first light distributing face, and a first light incident face on one side of said first light distributing face and said first light emitting face;
   a second light guide plate having a second light distributing face, a second light emitting face opposing said second light distributing face, and a second light incident face on one side of said second light distributing face and said second light emitting face, the first light distributing face of said first light guide plate opposing the second light emitting face of said second light guide plate;
   a first light source disposed on the first light incident face of said first light guide plate;
   a second light source disposed on the second light incident face of said second light guide plate, said first and second light source being arranged opposite to each other;
   a single-face prism sheet disposed on the first light emitting face of said first light guide plate;
   a transmissive display panel disposed on a light emitting face of said single-face prism sheet with no air gap therebetween, said transmissive display panel having a polarizing plate opposing the light emitting face of said single-face prism sheet; and
   a synchronous drive circuit adapted to synchronize said first and second light sources to display parallax images on said transmissive display panel,
   wherein a polarizing direction of polarization anisotropy of the light emitting face of said single-face prism sheet coincides with a polarizing direction of said polarizing plate, and coincides with a line perpendicular to a direction of optical axes of said first and second light sources, so that a luminous intensity at a light emitting face of said transmissive display panel relative to a luminous intensity at a light incident face of said transmissive display panel is maximum.

6. The non-spectacled stereoscopic display apparatus as set forth in claim 5, further comprising a contact layer disposed between said single-face prism sheet and said transmissive display panel.

7. The non-spectacled stereoscopic display apparatus as set forth in claim 6, wherein said contact layer comprises:
   a base; and
   an adhesive layer coated on said base.

8. The non-spectacled stereoscopic display apparatus as set forth in claim 6, wherein said contact layer comprises an adhesive layer coated on said single-face prism sheet.

* * * * *